(12) United States Patent
Brookshire et al.

(10) Patent No.: US 10,910,872 B2
(45) Date of Patent: Feb. 2, 2021

(54) AUTOMATED PROGRAMMABLE BATTERY BALANCING SYSTEM AND METHOD OF USE

(71) Applicant: L&B Solutions, LLC, Tyler, TX (US)

(72) Inventors: Bruce Garnett Brookshire, Tyler, TX (US); Mukul Shirvaikar, Tyler, TX (US); Gary Lindsey, Kilgore, TX (US)

(73) Assignee: L&B Solutions, LLC, Tyler, TX (US)

( * ) Notice: Subject to any disclaimer, the term of this patent is extended or adjusted under 35 U.S.C. 154(b) by 0 days.

(21) Appl. No.: 16/384,608

(22) Filed: Apr. 15, 2019

(65) Prior Publication Data

US 2019/0305585 A1 Oct. 3, 2019

Related U.S. Application Data

(63) Continuation of application No. 15/185,874, filed on Jun. 17, 2016, now Pat. No. 10,263,455.

(51) Int. Cl.
*H02J 7/00* (2006.01)
*H02J 7/35* (2006.01)
*H02J 13/00* (2006.01)

(52) U.S. Cl.
CPC .............. *H02J 7/35* (2013.01); *H02J 7/0063* (2013.01); *H02J 13/0075* (2013.01);
(Continued)

(58) Field of Classification Search
CPC .... H02J 7/35; H02J 7/0063; H02J 2007/0067; H02J 13/0075
(Continued)

(56) References Cited

U.S. PATENT DOCUMENTS 6,104,967 A 8/2000 Hagen et al.
6,239,579 B1 5/2001 Dunn et al.
(Continued)

FOREIGN PATENT DOCUMENTS

WO 2005088804 A1 9/2005

OTHER PUBLICATIONS

Yoon et al., "SWATS: Wireless Sensor Networks for Steamflood and Waterflood Pipeline Monitoring". USC/Information Sciences Institute IEEE Network Magazine, 25.1 (2009); pp. 50-56.
(Continued)

*Primary Examiner* — Nathaniel R Pelton
(74) *Attorney, Agent, or Firm* — Schultz & Associates, P.C.

(57) ABSTRACT

The present disclosure provides a programmable controller for monitoring battery performance and usage at a remote pump jack location. The disclosure provides an energy efficient controller and display system which allows the operator to quickly and accurately test batteries in an installation. It uses programmable logic to switch between system modes and decide which battery supplies power to the output. Further it will sense any high voltages at and disable the input from the faulty source. Further, the programmable logic is designed such that the mode selection process is automatic when the system is in operation. The purpose is to elongate battery and connected equipment life by preventing battery failure. The present disclosure also provides an easy and economical method of communicating potential battery failure and status to an operator via cell phone communication.

22 Claims, 56 Drawing Sheets

(52) U.S. Cl.
CPC ....... *H02J 2007/0067* (2013.01); *Y02E 40/70* (2013.01); *Y04S 10/123* (2013.01)

(58) Field of Classification Search
USPC .......................................................... 320/134
See application file for complete search history.

(56) References Cited

U.S. PATENT DOCUMENTS

| | | | |
|---|---|---|---|
| 6,507,169 | B1 | 1/2003 | Holtom et al. |
| 6,985,831 | B2 | 1/2006 | Ito et al. |
| 7,816,891 | B2 | 10/2010 | Nebrigic et al. |
| 7,834,583 | B2* | 11/2010 | Elder ................... B60L 3/0046 307/10.7 |
| 7,944,662 | B2 | 5/2011 | Carkner et al. |
| 7,990,101 | B2* | 8/2011 | Hoff ...................... H01M 2/105 320/107 |
| 8,120,364 | B2 | 2/2012 | Elder et al. |
| 8,143,851 | B2* | 3/2012 | Greening ................ G06F 1/189 320/116 |
| 8,406,936 | B1 | 3/2013 | Borumand et al. |
| 8,462,937 | B2 | 6/2013 | Wahby et al. |
| 8,471,530 | B2 | 6/2013 | Yoshikawa |
| 8,504,314 | B2 | 8/2013 | Rocci et al. |
| 8,519,673 | B2 | 8/2013 | Williams |
| 8,564,247 | B2 | 10/2013 | Hintz et al. |
| 8,648,568 | B2 | 2/2014 | McCollum et al. |
| 8,754,543 | B2 | 6/2014 | Svensson et al. |
| 8,765,276 | B2 | 7/2014 | Baglino et al. |
| 8,872,474 | B2 | 10/2014 | Scheucher |
| 2004/0036475 | A1 | 2/2004 | Pascoe |
| 2011/0068746 | A1 | 3/2011 | Rocci et al. |
| 2011/0187309 | A1 | 8/2011 | Chan et al. |
| 2014/0184161 | A1 | 7/2014 | Deal et al. |
| 2014/0265604 | A1* | 9/2014 | Mergener .............. H02J 7/0063 307/80 |
| 2018/0294664 | A1* | 10/2018 | Hong ....................... H02H 7/18 |

OTHER PUBLICATIONS

Atmel; "8-bit AVR Microcontroller with 8/16/32K bytes of ISP flash and USB Controller"; 7799ES-AVR-9/2012; (2012) Atmel Corporation; www.atmel.com/images/7799s.pdf; pp. 1-22.

Idachaba, "Review of Remote Terminal Unit (RTU) and Gateways for Digital Oilfield delpoyments"; (IJACSA) International Journal of Advanced Computer Science and Applications, vol. 3, No. 8 (2012); pp. 157-160.

Rahimi-Eichi et al., "Battery Management System: An Overview of Its Application in the Smart Grid and Electric Vehicles", Industrial Electronics Magazine, IEEE vol. 7, Issue 2 (Jun. 2013): pp. 4-16.

Arduino (tm) UNO Board, Arduino & Genuino Products; Arduino 2016; https://www.arduino.cc/en/Main/ArduinoBoardUno; (printed Mar. 29, 2016); 6 pages.

Arduino UNO Rev3 (UNO schematic); https://www.arduino.cc/en/.../Arduino_Uno_Rev3-schematic.pdf; last accessed Mar. 29, 2016; printed Mar. 29, 2016; 1 page.

Atmel; "ATmega48A/PA/88A/PA/168A/PA/328/P"; Atmel-8271js-avr-atemga-datasheet_Nov. 2015; (2015); Atmel Corporation; pp. 1-50.

"SIM808_Hardware_Design_V1.02"; Version 1.02; Shanghai SIMCom Wireless Solutions Ltd.; (Apr. 9, 2015); pp. 1-74.

Matherne, Jr., "Best Practices of Chemical Injection System Design for Oil & Gas Production," Check Point Pumps & Systems, pp. 1-8 (undated).

* cited by examiner

| FIG. 3A | FIG. 3B | FIG. 3C | FIG. 3D |

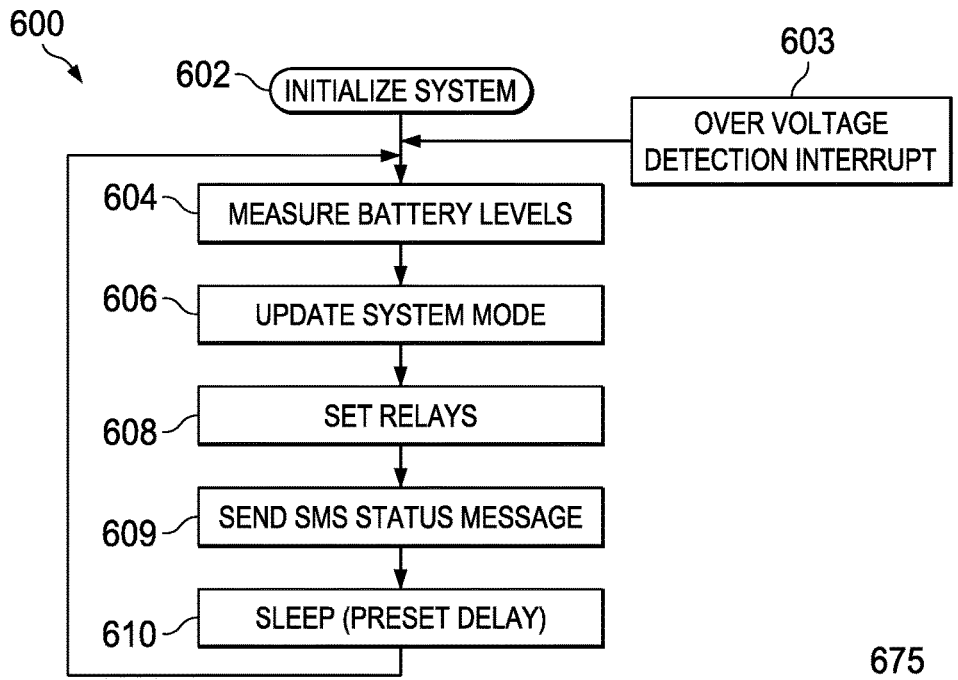
FIG. 6A
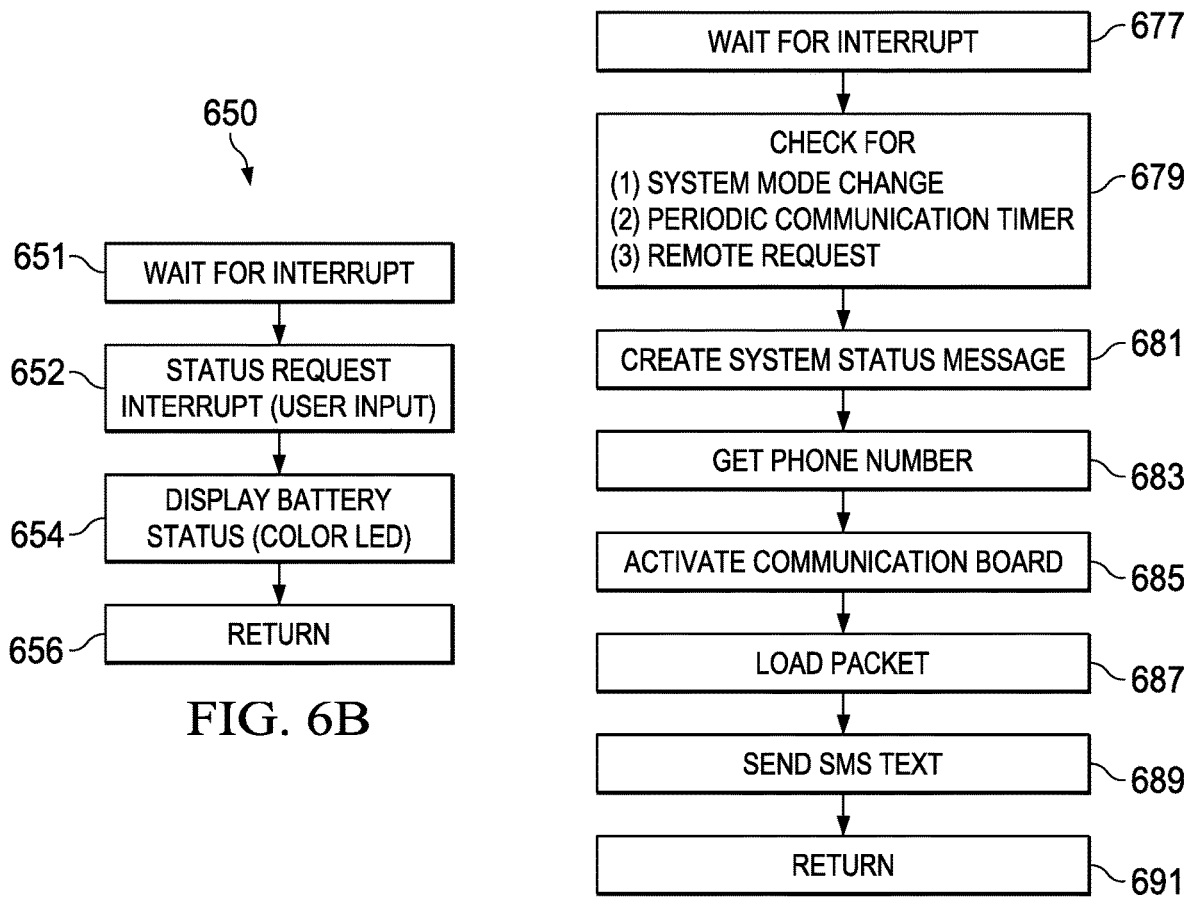
FIG. 6B
FIG. 6C

|  | >VGND (0.0) | >VFAIL (2.0) | >V0 (11.5) | >V25 (11.62) | >V50 (11.86) | >V75 (12.16) | >V100 (12.49) | >VCH (12.75) | >VHIGH (16.0) |
|---|---|---|---|---|---|---|---|---|---|
| >VHIGH (16.0) | E2 | E1 | E1 | E1 | E1 | E1 | E1 | E2 | E2 |
| >VCH (12.75) | E0 | M1 | M1 | M1 | M1 | M1 | M1 | E0 | E0 |
| >V100 (12.49) | E0 | M1 | M1 | M1 | M1 | M1 | M1 | E0 | E0 |
| >V75 (12.16) | E0 | M1 | M1 | M1 | M1 | M1 | M1 | E0 | E0 |
| >V50 (11.86) | E0 | M1 | M1 | M1 | M2 | M2 | M2 | E0 | E0 |
| >V25 (11.62) | E0 | M1 | M1 | M1 | M2 | M2 | M2 | E0 | E0 |
| >V0 (11.5) | E0 | M1 | M1 | M1 | M2 | M2 | M2 | E0 | E0 |
| >VFAIL (2.0) | E2 | E1 | E1 | E1 | E1 | E1 | E1 | E2 | E2 |
| >VGND (0.0) | E2 | E1 | E1 | E1 | E1 | E1 | E1 | E2 | E2 |
| BAT2/BAT1 |  |  |  |  |  |  |  |  |  |

```
#include <Sleep_n0m1.h>
#include "analogComp.h"

define CELLCOMM                                                    802 ifdef CELLCOM
include "Adafruit_FONA.h"

#define FONA_RX 2
#define FONA_TX 3
#define FONA_RST 4

// this is a large buffer for replies
char replybuffer[255];
char fonaInBuffer[64];          //for notifications from the FONA
char operatorIDbuffer[32] = "19036176579"

// We default to using software serial. If you want to use hardware serial
// (because softserial isnt supported) comment out the following three lines
// and uncomment the HardwareSerial line
#include <SoftwareSerial.h>
SoftwareSerial fonaSS = SoftwareSerial(FONA_TX, FONA_RX);
SoftwareSerial *fonaSerial = &fonaSS;

// Hardware serial is also possible!
//  HardwareSerial *fonaSerial = &Serial1;

Adafruit_FONA fona = Adafruit_FONA(FONA_RST);

uint8_t readline(char *buff, uint8_t maxbuff, uint16_t timeout = 0);

unsigned long commCount, commThreshold;    // how many times sampled since last mode change define COMMCHECKCOUNT 48          // 24 hours = 30 times 48
define DBGCOMMCHECKCOUNT 9        // 63 seconds = 9 times 7 define COMMCONTINUOUS     1
defineCOMMHIBERNATE 2 uint8_t commMode;

endif // CELLCOM
```

FROM FIG. 8A

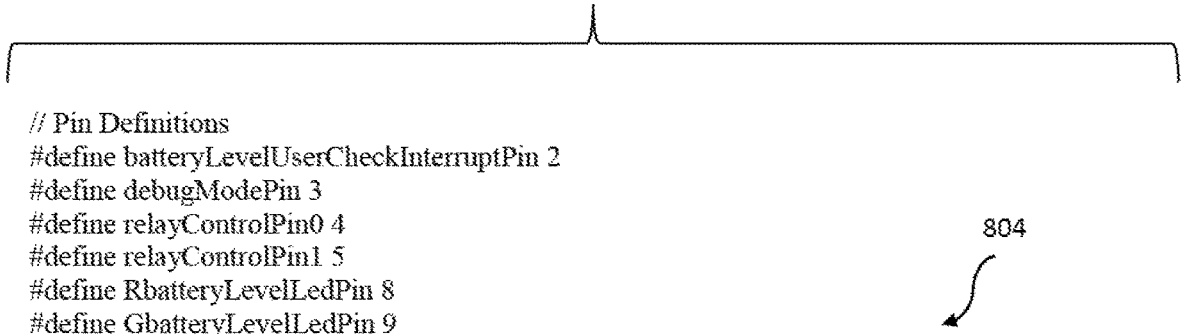

```
// Pin Definitions
#define batteryLevelUserCheckInterruptPin 2
#define debugModePin 3
#define relayControlPin0 4
#define relayControlPin1 5
#define RbatteryLevelLedPin 8
#define GbatteryLevelLedPin 9
#define BbatteryLevelLedPin 10
#define boardLedPin 13

// Time interval definitions
#define SAMPLEINTERVAL 1800000    // 30 minutes in ms
#define CHECKCOUNT 8              // 4 hours = 30 times 8
#define DBGSALEINTERVAL 3000      // 3 seconds in ms
#define DBGCHECKCOUNT 3           // 21 seconds = 3 times 7

//#define CATHODELED  1           // define is color LED is cathode

// Battery Voltage Level definitions
#define VHIGH 16
#define VCHARGING 12.75
#define V100 12.50      // was 12.49
#define V75 12.25       // was 12.16
#define V50 12.00       // was 11.86
#define V25 11.75       // was 11.62
#define V0 11.5
#define VFAIL 2.0
#define VGND 0.0

// Battery Voltage Mode definitions
#define BVUNKNOWN 255    // none LED
#define BVHIGH 0         // magenta LED
#define BVCHARGING 1     // white LED
#define BV100 2          // green LED
#define BV75 3           // green LED
#define BV50 4           // yellow LED
#define BV25 5           // red LED
#define BV0 6            // red LED
#define BVFAIL 7         // cyan LED
#define BVGND 8          // blue LED
```

FROM FIG. 8B

```
// Mode definitions
#define E0MODE  0      // only battery 0 supplying power
#define E1MODE  1      // only battery 1 supplying power
#define E2MODE  2      // no power - no battery voltages
#define MODE1 7        // normal mode switching periodically
#define MODE2 8        // switching based on battery levels
define MODE3 9        // both batteries supplying power float batteryLevel0, batteryLevel1;
float scaleFactor, voltDivRatio0, voltDivRatio1;
boolean relay0, relay1;
boolean debugMode;          // debugMode is either true or falseSleep sleep;
unsigned long sleepTime;    // how long you want the arduino to sleep
unsigned long sampleCount, sThreshold;   // how many times sampled since last mode change
unsigned int bMode0, bMode1;       // battery modes
unsigned int bHist0, bHist1;       // battery modes
unsigned int sysMode;              // system mode
unsigned int debugVal;             // debug mode
volatile unsigned int batteryISRcalled;
```

FROM FIG. 8C

```
void setup() {
  // put your setup code here, to run once:
  noInterrupts();

ifdef CELLCOM while (!Serial);

Serial.begin(115200);
  Serial.println(F("FONA SMS"));
  Serial.println(F("Initializing....(May take 3 seconds)"));

fonaSerial->begin(115200);

// Print SIM card IMEI number.
  char imei[15] = {0}; // MUST use a 16 character buffer for IMEI!
  uint8_t imeiLen = fona.getIMEI(imei);
  if (imeiLen > 0) {
    Serial.print("SIM card IMEI: "); Serial.println(imei);
  }

Serial.println("FONA Ready");

if(debugMode)
  {
    commThreshold = DBGCOMMCHECKCOUNT;
    commCount = commThreshold + 1;     // fire up comm the first time around
  }
  else
  {
    commThreshold = COMMCHECKCOUNT;
    commCount = commThreshold + 1;     // fire up comm the first time around
  } commMode = COMMHIBERNATE;              // default mode
else
  Serial.begin(9600);
#enif // CELLCOM
```

FROM FIG. 8D

```
pinMode(debugModePin, INPUT_PULLUP);
debugVal = digitalRead(debugModePin);
if(debugVal == HIGH)
{
  debugMode = false;
}
else
{
  debugMode = true;
}
if(debugMode)
{
  Serial.println("Initializing...");
  delay(100);
} pinMode(boardLedPin, OUTPUT);

pinMode(relayControlPin0, OUTPUT);
pinMode(relayControlPin1, OUTPUT);

pinMode(batteryLevelUserCheckInterruptPin, INPUT_PULLUP);
attachInterrupt(0, setBatteryISRflag, FALLING);
pinMode(RbatteryLevelLedPin, OUTPUT);
pinMode(GbatteryLevelLedPin, OUTPUT);
pinMode(BbatteryLevelLedPin, OUTPUT);

if(debugMode)
{
  sleepTime = DBGSAMPLEINTERVAL;    //set sleep time in ms, max sleep time is 49.7 days
  sThreshold = DBGCHECKCOUNT;
  sampleCount = sThreshold + 1;    // fire up relays the first time around
}
else
{
  sleepTime = SAMPLEINTERVAL;    //set sleep time in ms, max sleep time is 49.7 days
  sThreshold = CHECKCOUNT;
  sampleCount = sThreshold + 1;    // fire up relays the first time around
}
```

FROM FIG. 8E

```
batteryLevel0 = 0;
batteryLevel1 = 0;
scaleFactor = 5.0/1023.0;        // was 5.0/1023.0;
voltDivRatio0 = (30.0 + 10.0)/10.0;
voltDivRatio1 = (36.0 + 10.0)/10.0;
relay0 = false;
relay1 = false;
bMode0 = bMode1 = BVUNKNOWN;
sysMode = MODE2;                 // default MODE 2 upon request
batteryISRcalled = false;

interrupts();

delay(100);
measureBatteryLevels();
delay(100);
measureBatteryLevels();
updateBatteryModes();
updateSystemMode();
bHist0 = bMode0;                 //set first time even if charging
bHist1 = bMode1;

digitalColorLED(HIGH, HIGH, HIGH, 500);    // white
digitalColorLED(HIGH, LOW, LOW, 500);      // red
digitalColorLED(LOW, HIGH, LOW, 500);      // green
digitalColorLED(LOW, LOW, HIGH, 500);      // blue
digitalColorLED(HIGH, HIGH, LOW, 500);     // yellow
digitalColorLED(HIGH, LOW, HIGH, 500);     // magenta
digitalColorLED(LOW, HIGH, HIGH, 500);     // cyan
digitalColorLED(HIGH, HIGH, HIGH, 500);    // white displayBatteryLevels();

analogComparator.setOn(AIN0, AIN1); //we instruct the lib to use voltages on the pins PIN6 - AIN0 PIN7 - AIN1 (3.3V)
if(!((bMode0 == BVHIGH)||(bMode1 == BVHIGH))){
  analogComparator.enableInterrupt(batteryLevelTooHigh, CHANGE); //we set the interrupt and when it has to be raised
}
```

FROM FIG. 8F
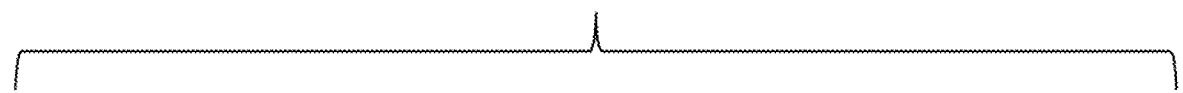
806
```
if(debugMode)
 {
  Serial.println("Startup Complete. Operating switch.");
  delay(100);
 }
}
```
FIG. 8G
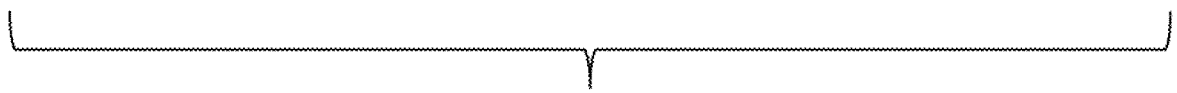
TO FIG. 8H

FROM FIG. 8G

```
void loop() {
  // put your main code here, to run repeatedly:
  debugVal = digitalRead(debugModePin);
  if(debugVal == HIGH)
  {
    debugMode = false;
  }
  else
  {
    debugMode = true;
  }
  if(debugMode)
  {
    Serial.print("Starting loop.... ");
    delay(100);
  } measureBatteryLevels();
  updateBatteryModes();
  updateSystemMode();
  sampleCount++;
  setRelays();             // set relay signals based on system mode if(debugMode)
  {
    Serial.print("[sampleCount, threshold] = [");
    Serial.print(sampleCount);
    Serial.print(", ");
    Serial.print(sThreshold);
    Serial.println("]");
    Serial.print("sleepTime =");
    Serial.println(sleepTime);
    Serial.println("Entering Power Save Mode.");
    delay(100);
  }
  if(batteryISRcalled == true)
  {
    displayBatteryLevels();
  }
  if(!((bMode0 == BVHIGH)||(bMode1 == BVHIGH))){
    analogComparator.enableInterrupt(batteryLevelTooHigh, CHANGE); //we set the interrupt and when it has to be raised
  }
```

FROM FIG. 8H

```
#ifdef CELLCOM
handleCommunications();
endif // CELLCOM sleep.adcMode();            //set sleep mode
  sleep.sleepDelay(sleepTime);    //sleep for: sleepTime
}
```

FROM FIG. 8I

```
void measureBatteryLevels() {
 float bl1, bl2, bl3, bl4;

if(debugMode)                                                810
  {
   Serial.println("Measuring Battery Levels.");
    delay(100);
  } delay(50);
  bl1 = analogRead(A0)*scaleFactor*voltDivRatio0;
  delay(50);
  bl2 = analogRead(A0)*scaleFactor*voltDivRatio0;
  delay(50);
  bl3 = analogRead(A0)*scaleFactor*voltDivRatio0;
  delay(50);
  bl4 = analogRead(A0)*scaleFactor*voltDivRatio0;
  delay(50);
  batteryLevel0 = (bl1+bl2+bl3+bl4)/4.0;

bl1 = analogRead(A1)*scaleFactor*voltDivRatio0;
  delay(50);
  bl2 = analogRead(A1)*scaleFactor*voltDivRatio0;
  delay(50);
  bl3 = analogRead(A1)*scaleFactor*voltDivRatio0;
  delay(50);
  bl4 = analogRead(A1)*scaleFactor*voltDivRatio0;
  delay(50);
  batteryLevel1 = (bl1+bl2+bl3+bl4)/4.0;

if(debugMode)
   {
    Serial.print("batteryLevel0 =");
    Serial.println(batteryLevel0);
    Serial.print("batteryLevel1 =");
    Serial.println(batteryLevel1);
    Serial.println("Exiting Measure Battery Levels.");
     delay(100);
   }
 }
```

FROM FIG. 8J

```
void updateBatteryModes() {
 if(debugMode)
  {
    Serial.println("Updating Battery Modes.");
    delay(100);
  } if(batteryLevel0 > VHIGH) {bMode0 = BVHIGH;}
  else if(batteryLevel0 > VCHARGING) {bMode0 = BVCHARGING;}
  else if(batteryLevel0 > V100) {bMode0 = BV100;}
  else if(batteryLevel0 > V75) {bMode0 = BV75;}
  else if(batteryLevel0 > V50) {bMode0 = BV50;}
  else if(batteryLevel0 > V25) {bMode0 = BV25;}
  else if(batteryLevel0 > V0) {bMode0 = BV0;}
  else if(batteryLevel0 > VFAIL) {bMode0 = BVFAIL;}
  else {bMode0 = BVGND;};
  if(bMode0 != BVCHARGING)
  {
    bHist0 = bMode0;
  } if(batteryLevel1 > VHIGH) {bMode1 = BVHIGH;}
  else if(batteryLevel1 > VCHARGING) {bMode1 = BVCHARGING;}
  else if(batteryLevel1 > V100) {bMode1 = BV100;}
  else if(batteryLevel1 > V75) {bMode1 = BV75;}
  else if(batteryLevel1 > V50) {bMode1 = BV50;}
  else if(batteryLevel1 > V25) {bMode1 = BV25;}
  else if(batteryLevel1 > V0) {bMode1 = BV0;}
  else if(batteryLevel1 > VFAIL) {bMode1 = BVFAIL;}
  else {bMode1 = BVGND;};
  if(bMode1 != BVCHARGING)
  {
    bHist1 = bMode1;
  }
```

FROM FIG. 8K

```
if(debugMode)
 {
  Serial.print("bMode0 =");
  Serial.println(bMode0);
  Serial.print("bMode1 =");
  Serial.println(bMode1);
  Serial.print("bHist0 =");
  Serial.println(bHist0);
  Serial.print("bHist1 =");
  Serial.println(bHist1);
  Serial.println("Exiting Update Battery Modes.");
  delay(100);
 }
}
```

FROM FIG. 8L

```
void updateSystemMode() {
 if(debugMode)
  {
   Serial.println("Changing System Mode.");
   delay(100);
  }                                                      814 if((bMode0 > BV25) && (bMode1 > BV25)) {sysMode = E2MODE;}
 else if ((bMode0 == BVHIGH) && (bMode1 == BVHIGH)) {sysMode = E2MODE;}
 else if((bMode0 > BV25) && (bMode1 == BVHIGH)) {sysMode = E2MODE;}
 else if ((bMode0 == BVHIGH) && (bMode1 > BV25)) {sysMode = E2MODE;}
 else if (((bMode0 == BVHIGH) || (bMode0 > BV25))
        && ((bMode1 > BVHIGH) && (bMode1 < BV0))) {sysMode = E1MODE;}
 else if (((bMode1 == BVHIGH) || (bMode1 > BV25))
        && ((bMode0 > BVHIGH) && (bMode0 < BV0))) {sysMode = E0MODE;}
 else if (((bMode0 == BV0) && (bMode1 == BV0))
     || ((bMode0 == BV0) && (bMode1 == BV25))
     || ((bMode0 == BV25) && (bMode1 == BV0))
     || ((bMode0 == BV25) && (bMode1 == BV25))) {sysMode = MODE2;}    // change this
to MODE3 if both battereies need to be on
 else if (((bMode0 == BV0) && (bMode1 == BV50))
     || ((bMode0 == BV25) && (bMode1 == BV50))
     || ((bMode0 == BV50) && (bMode1 == BV50))
     || ((bMode0 == BV50) && (bMode1 == BV25))
     || ((bMode0 == BV50) && (bMode1 == BV0))) {sysMode = MODE2;}
 else {sysMode = MODE2;}        // note was MODE 1, change to MODE2 under request if(debugMode)
  {
   Serial.print("sysMode =");
   Serial.println(sysMode);
   Serial.println("Exiting Update System Mode.");
   delay(100);
  }
 }
```

FROM FIG. 8M

```
void setRelays() {
 if(debugMode)
 {
  Serial.println("Set Relays.");
  Serial.print("sysMode =");
  Serial.println(sysMode);
  delay(100);
 } switch(sysMode) {
  case E0MODE:
     relay0 = true;
     relay1 = false;
    break;
  case E1MODE:
     relay0 = false;
     relay1 = true;
    break;
  case E2MODE:
     relay0 = false;
     relay1 = false;
    break;
  case MODE1:
     if((relay0 == false) && (relay1 == false)) {
      relay0 = true;
      relay1 = false;
     // sampleCount = 0;
     }
     if(!((bMode0 == BVCHARGING)&&(bMode1 == BVCHARGING))) {
      if(sampleCount > sThreshold) {
       relay0 = !relay0;
       relay1 = !relay1;
       sampleCount = 0;
      }
     }
    break;
  case MODE2:
     if(sampleCount > sThreshold) {
        if(batteryLevel0 > batteryLevel1)
          {relay0 = true; relay1 = false;}
        else
          {relay0 = false; relay1 = true;}
        sampleCount = 0;
     }
```

FROM FIG. 8N

```
    break;
  case MODE3:
    relay0 = true;
    relay1 = true;
    break;
  default: // should never enter default but just in case
    if(sampleCount > sThreshold) {
      if(batteryLevel0 > batteryLevel1)
        {relay0 = true; relay1 = false;}
      else
        {relay0 = false; relay1 = true;}
      sampleCount = 0;
    }
    digitalColorLED(HIGH, LOW, LOW, 500); // Error code here - flash red LED once
    break;
} digitalWrite(relayControlPin0, relay0);
digitalWrite(relayControlPin1, relay1);

if(debugMode)
 {
  Serial.print("relay0 =");
  Serial.println(relay0);
  Serial.print("relay1 =");
  Serial.println(relay1);
  Serial.println("Exiting Set Relays.");
  delay(100);
 }
}
```

FROM FIG. 8O

```
void displayBatteryLevels() {
 if(debugMode)
 {                                                                   818
  Serial.println("Display Battery Levels");
  delay(100);
 } digitalColorLED(HIGH, HIGH, HIGH, 500);                      // white
  if(bHist0 == BVHIGH) {digitalColorLED(HIGH, LOW, HIGH, 500);}      // magenta
  else if (bHist0 == BVCHARGING) {digitalColorLED(HIGH, HIGH, HIGH, 500);}  // white
  else if (bHist0 == BV100) {digitalColorLED(LOW, HIGH, LOW, 500);}      // green
  else if (bHist0 == BV75) {digitalColorLED(LOW, HIGH, LOW, 500);}       // green
  else if (bHist0 == BV50) {digitalColorLED(HIGH, HIGH, LOW, 500);}      // yellow
  else if (bHist0 == BV25) {digitalColorLED(HIGH, LOW, LOW, 500);}       // red
  else if (bHist0 == BV0) {digitalColorLED(HIGH, LOW, LOW, 500);}        // red
  else if (bHist0 == BVFAIL) {digitalColorLED(LOW, HIGH, HIGH, 500);}    // cyan
  else if (bHist0 == BVGND) {digitalColorLED(LOW, LOW, HIGH, 500);}      // blue
  else if (bHist0 == BVUNKNOWN) {digitalColorLED(LOW, LOW, LOW, 500);} digitalColorLED(HIGH, HIGH, HIGH, 500);                      // white
  digitalColorLED(HIGH, HIGH, HIGH, 500);                      // white
  if(bHist1 == BVHIGH) {digitalColorLED(HIGH, LOW, HIGH, 500);}      // magenta
  else if (bHist1 == BVCHARGING) {digitalColorLED(HIGH, HIGH, HIGH, 500);}  // white
  else if (bHist1 == BV100) {digitalColorLED(LOW, HIGH, LOW, 500);}      // green
  else if (bHist1 == BV75) {digitalColorLED(LOW, HIGH, LOW, 500);}       // green
  else if (bHist1 == BV50) {digitalColorLED(HIGH, HIGH, LOW, 500);}      // yellow
  else if (bHist1 == BV25) {digitalColorLED(HIGH, LOW, LOW, 500);}       // red
  else if (bHist1 == BV0) {digitalColorLED(HIGH, LOW, LOW, 500);}        // red
  else if (bHist1 == BVFAIL) {digitalColorLED(LOW, HIGH, HIGH, 500);}    // cyan
  else if (bHist1 == BVGND) {digitalColorLED(LOW, LOW, HIGH, 500);}      // blue
  else if (bHist1 == BVUNKNOWN) {digitalColorLED(LOW, LOW, LOW, 500);} batteryISRcalled = false;

if(debugMode)
 {
  Serial.println("Exiting Display Battery Levels.");
  delay(100);
 }
}
```

FROM FIG. 8P

```
void digitalColorLED(int rC, int gC, int bC, int delayTime) { ifdef CATHODELED
   digitalWrite(RbatteryLevelLedPin, rC);
   digitalWrite(GbatteryLevelLedPin, gC);
   digitalWrite(BbatteryLevelLedPin, bC);
   delay(delayTime);
   digitalWrite(RbatteryLevelLedPin, LOW);
   digitalWrite(GbatteryLevelLedPin, LOW);
   digitalWrite(BbatteryLevelLedPin, LOW);
   delay(250);
#else
   digitalWrite(RbatteryLevelLedPin, (1-rC));
   digitalWrite(GbatteryLevelLedPin, (1-gC));
   digitalWrite(BbatteryLevelLedPin, (1-bC));
   delay(delayTime);
   digitalWrite(RbatteryLevelLedPin, HIGH);
   digitalWrite(GbatteryLevelLedPin, HIGH);
   digitalWrite(BbatteryLevelLedPin, HIGH);
   delay(250);
#endif

FROM FIG. 8Q

```
void setBatteryISRflag() {
  batteryISRcalled = true;
}
```

FROM FIG. 8R

```
void batteryLevelTooHigh() { analogComparator.disableInterrupt(); //we disable the interrupt to prevent continuous triggering if(debugMode)
  {
    Serial.println("Analog Interrupt Triggered....");
    delay(100);
  }
  measureBatteryLevels();
  updateBatteryModes();
  updateSystemMode();
  setRelays();         // set relay signals based on system mode if(!((bMode0 == BVHIGH)||(bMode1 == BVHIGH))){
    analogComparator.enableInterrupt(batteryLevelTooHigh, CHANGE); //we set the interrupt and when it has to be raised
  } if(debugMode)
  {
    Serial.println("Exiting Analog Interrupt ISR.");
    delay(100);
  }
}
```

FROM FIG. 8S

```
void handleCommunications() {
char* bufPtr = fonaInBuffer;   //handy buffer pointer sprintf(replybuffer,"BAT0 %5.2f BAT1 %5.2f", batteryLevel0, batteryLevel1);

switch(commMode) {
        case COMMCONTINUOUS:
                if(!(fona.powerstatus()))fona.powerup();

// Send system status message to caller if requested
                if (fona.available())    //any data available from the FONA?
                {
                    int slot = 0;        //this will be the slot number of the SMS
                    int charCount = 0;
                    //Read the notification into fonaInBuffer
                    do {
                            *bufPtr = fona.read();
                            Serial.write(*bufPtr);
                            delay(1);
                    } while ((*bufPtr++ != '\n') && (fona.available()) && (++charCount < (sizeof(fonaInBuffer)-1)));

//Add a terminal NULL to the notification string
                    *bufPtr = 0;

//Scan the notification string for an SMS received notification.
                    // If it's an SMS message, we'll get the slot number in 'slot'
                    if (1 == sscanf(fonaInBuffer, "+CMTI: \"SM\",%d", &slot)) {
                      Serial.print("slot: "); Serial.println(slot);
```

FROM FIG. 8T

```
char callerIDbuffer[32]; //we'll store the SMS sender number in here

// Retrieve SMS sender address/phone number.
if (! fona.getSMSSender(slot, callerIDbuffer, 31)) {
  Serial.println("Didn't find SMS message in slot!");
}
Serial.print(F("FROM: ")); Serial.println(callerIDbuffer);

//Send back an automatic response
Serial.println("Sending response...");
if (!fona.sendSMS(callerIDbuffer, replybuffer)) {
  Serial.println(F("Failed"));
} else {
  Serial.println(F("Sent!"));
}

// delete the original msg after it is processed
//   otherwise, we will fill up all the slots
//   and then we won't be able to receive SMS anymore
if (fona.deleteSMS(slot)) {
  Serial.println(F("OK!"));
} else {
  Serial.println(F("Couldn't delete"));
}
    }
  }
}

// Send system status message to operator if system mode is a problem if((sysMode != MODE1) && (sysMode != MODE2)) {
    //Send back an automatic response
    Serial.println("Sending response...");
    if (!fona.sendSMS(operatorIDbuffer, replybuffer)) {
      Serial.println(F("Failed"));
    } else {
      Serial.println(F("Sent!"));
    }
}
break;
```

FROM FIG. 8U

```
case COMMHIBERNATE:
        // Send system status message to operator if system mode is a problem or periodically
        if((sysMode != MODE1) && (sysMode != MODE2)) || (commCount > commThreshold)) { if(!(fona.powerstatus())fona.powerup();

//Send back an automatic response
            Serial.println("Sending response...");
            if (!fona.sendSMS(operatorIDbuffer, replybuffer)) {
              Serial.println(F("Failed"));
            } else {
              Serial.println(F("Sent!"));
            } fona.powerdown();
        } if(commCount > commThreshold)
            {
                commCount = 0;
            }
        else
            {
                commCount++;
            }
        break;

default:
        break;
    }

```
//include required libraries
#include "analogComp.h"

//global variables
typedef void (*userFunc)(void); volatile
static userFunc userFunction; uint8_t
_initialized;
uint8_t _interruptEnabled;
uint8_t oldADCSRA;

//setting and switching on the analog comparator
uint8_t analogComp::setOn(uint8_t tempAIN0, uint8_t tempAIN1) {
    if (_initialized) { //already running
        return 1;
    }

//initialize the analog comparator (AC)
    ACSR &= ~(1<<ACIE); //disable interrupts on
    AC ACSR &= ~(1<<ACD); //switch on the AC //choose the input for non-inverting input if
    (tempAIN0 == INTERNAL_REFERENCE)
    {
        ACSR |= (1<<ACBG); //set Internal Voltage Reference (1V1)
    } else {
        ACSR &= ~(1<<ACBG); //set pin AIN0
    }

//for Atmega32U4, only ADMUX is allowed as input for AIN-
#ifdef ATMEGAxU
    if (tempAIN1 == AIN1) {
        tempAIN1 = 0; //choose ADC0
    }
#endif
```

FIG. 9A

```
//AtTiny2313/4313 don't have ADC, so inputs are always AIN0 and AIN1
#ifndef ATTINYx313
    // allow for channel or pin numbers
#if defined (ATMEGAx0)
    if (tempAIN1 >= 54) tempAIN1 -= 54;
#elif defined (ATMEGAxU)
    if (tempAIN1 >= 18) tempAIN1 -= 18;
#elif defined (ATMEGAx4)
    if (tempAIN1 >= 24) tempAIN1 -= 24;
#elif defined (CORE_ANALOG_FIRST) && (defined (ATTINYx5) || defined (ATTINYx4))
    if (tempAIN1 >= CORE_ANALOG_FIRST) {
        tempAIN1 -= CORE_ANALOG_FIRST;
    }
else
    if (tempAIN1 >= 14) tempAIN1 -= 14;
#endif
    //choose the input for inverting input
    oldADCSRA = ADCSRA;
    if ((tempAIN1 >= 0) && (tempAIN1 < NUM_ANALOG_INPUTS)) { //set the AC
Multiplexed
        Input using an analog input pin
        ADCSRA &= ~(1<<ADEN);
        ADMUX &= ~31; //reset the first 5 bits
        ADMUX |= tempAIN1; //choose the ADC channel
        (0..NUM_ANALOG_INPUTS-1) AC_REGISTER |= (1<<ACME);
    } else {
        AC_REGISTER &= ~(1<<ACME); //set pin AIN1
    }
#endif
```

FIG. 9B

```
//disable digital buffer on pins AIN0 && AIN1 to reduce current consumption
#if defined(ATTINYx5)
    DIDR0 &= ~((1<<AIN1D) | (1<<AIN0D));
#elif defined(ATTINYx4)
    DIDR0 &= ~((1<<ADC2D) | (1<<ADC1D));
#elif defined
    (ATMEGAx4)
    DIDR1 &=
    ~(1<<AIN0D);
#elif defined (ATTINYx313)
    DIDR &= ~((1<<AIN1D) | (1<<AIN0D));
#elif defined (ATMEGAx8) || defined(ATMEGAx4) ||
    defined(ATMEGAx0) DIDR1 &= ~((1<<AIN1D) | (1<<AIN0D));
#endif
    _initialized = 1;
    return 0; //OK
}

//enable the interrupt on comparations
void analogComp::enableInterrupt(void (*tempUserFunction)(void), uint8_t tempMode) {
    if (_interruptEnabled) { //disable interrupts
        SREG &=
        ~(1<<SREG_I);
        ACSR &=
        ~(1<<ACIE);
    }
```

FIG. 9C

```
if (!_initialized) {
    setOn(AIN0, AIN1);
}
//set the interrupt mode
userFunction =
tempUserFunction; if (tempMode
== CHANGE) {
    ACSR &= ~((1<<ACIS1) | (1<<ACIS0)); //interrupt on toggle event
} else if (tempMode ==
    FALLING) { ACSR &=
    ~(1<<ACIS0);
    ACSR |= (1<<ACIS1);
} else { //default is RISING
    ACSR |= ((1<<ACIS1) | (1<<ACIS0));

}
//enable interrupts
ACSR |=
(1<<ACIE); SREG
|= (1<<SREG_I);
    _interruptEnabled = 1;
}

//disable the interrupt on comparations void
analogComp::disableInterrupt(void) {
    if ((!_initialized) || (!_interruptEnabled)) {
        return;
    }
    ACSR &= ~(1<<ACIE); //disable interrupt
    _interruptEnabled = 0;
}
```

FIG. 9D

```
//switch off the analog comparator
void analogComp::setOff() {
    if (_initialized) {
        if (_interruptEnabled) {
            ACSR &= ~(1<<ACIE); //disable interrupts on AC events
            _interruptEnabled = 0;
        }
        ACSR |= (1<<ACD); //switch off the AC //reenable digital buffer on pins AIN0 && AIN1
if defined(ATTINYx5)
        DIDR0 |= ((1<<AIN1D) | (1<<AIN0D));
#elif defined(ATTINYx4)
        DIDR0 |= ((1<<ADC2D) | (1<<ADC1D));
#elif defined (ATMEGAx4)
        DIDR1 |=
        (1<<AIN0D);
#elif defined (ATTINYx313)
        DIDR |= ((1<<AIN1D) | (1<<AIN0D));
#elif defined (ATMEGAx8) || defined(ATMEGAx4) ||
        defined(ATMEGAx0) DIDR1 |= ((1<<AIN1D) |
        (1<<AIN0D));
endif ifndef ATTINYx313
        //if ((AC_REGISTER & (1<<ACME)) == 1) { //we must reset the ADC
        if (oldADCSRA & (1<<ADEN)) { //ADC has to be powered up
            AC_REGISTER |= (1<<ADEN); //ACDSRA =
                     oldADCSRA;
#endif

```
_initialized = 0;

//wait for a comparation until the function goes in timeout
uint8_t analogComp::waitComp(unsigned long _timeOut) {
    //exit if the interrupt is on if
    (_interruptEnabled) {
        return 0; //error
    }

//no timeOut?
    if (_timeOut == 0) {
        _timeOut = 5000; //5 secs
    }

//set up the analog comparator if it isn't if
    (!_initialized) {
        setOn(AIN0, AIN1);
        _initialized = 0;
    }

//wait for the comparation
    unsigned long _tempMillis = millis() + _timeOut;
    do {
        if ((ACSR && (1<<ACO)) == 1) { //event
            raised return 1;
        }
    } while ((long)(millis() - _tempMillis) < 0);

//switch off the analog comparator if it was off if
    (!_initialized) {
        setOff();
    }
    return 0;
}
```

FIG. 9F

```
//ISR (Interrupt Service Routine) called by the analog comparator when
//the user choose the raise of an interrupt
#if defined(ATMEGAx8) || defined(ATMEGAx0) || defined(ATMEGAx4)
ISR(ANALOG_COMP_vect) {
#else
ISR(ANA_COMP_vect) {
#endif
    userFunction(); //call the user function
} analogComp analogComparator;
```

```
#ifndef ANALOG_COMP_H
#define ANALOG_COMP_H

//Library is compatible both with Arduino <=0023 and Arduino >=100
#if defined(ARDUINO) && (ARDUINO >= 100)
#include "Arduino.h"
#else
#include "WProgram.h"
endif //used to set the man number of analog pins
ifdef NUM_ANALOG_INPUTS
#undef NUM_ANALOG_INPUTS
endif define AC_REGISTER ADCSRB
//check if the micro is supported
#if defined (__AVR_ATmega48__) || defined (__AVR_ATmega88__) || defined
   (__AVR_ATmega168__) || defined (__AVR_ATmega328__) || defined
   (__AVR_ATmega48P__) || defined (__AVR_ATmega88P__) || defined (__
   AVR_ATmega168P__) || defined
            (__
   AVR_ATmega328P_
          )
#define ATMEGAx8
#define NUM_ANALOG_INPUTS 6
#elif defined (__AVR_ATtiny25__) || defined (__AVR_ATtiny45__) || defined
   (__AVR_ATtiny85__)
#define ATTINYx5
#define NUM_ANALOG_INPUTS 4
#elif defined (__AVR_ATmega8__) || defined (__AVR_ATmega8A__)
#define ATMEGA8
#undef AC_REGISTER
#define AC_REGISTER SFIOR
#define NUM_ANALOG_INPUTS 6
```

FIG. 9H

```
#elif defined (__AVR_ATtiny24__) || defined (__AVR_ATtiny44__) || defined
   (__AVR_ATtiny84__)
#define ATTINYx4
#define NUM_ANALOG_INPUTS 8
#elif defined (__AVR_ATmega640__) || defined (__AVR_ATmega1280__) || defined
   (__AVR_ATmega1281__) || defined (__AVR_ATmega2560__) || defined (__
   AVR_ATmega2561__)
#define ATMEGAx0
#define NUM_ANALOG_INPUTS 16
#elif defined (__AVR_ATmega344__) || defined (__AVR_ATmega344P__) || defined
   (__AVR_ATmega644__) || defined (__AVR_ATmega644P__) || defined
   (__AVR_ATmega644PA__)
   || defined (__AVR_ATmega1284P
                        )

#define ATMEGAx4
#define NUM_ANALOG_INPUTS 8
#elif defined (__AVR_ATtiny2313__) || defined (__AVR_ATtiny4313__)
#define ATTINYx313
#define NUM_ANALOG_INPUTS 0
#elif defined (__AVR_ATmega32U4__)
#define ATMEGAxU
#define NUM_ANALOG_INPUTS 12
#else
#error Sorry, microcontroller not supported!
endif const uint8_t AIN0 = 0;
const uint8_t INTERNAL_REFERENCE = 1;
const uint8_t AIN1 = 255;
```

FIG. 91

```
class analogComp {
    public:
        //public methods
        //analogComp();
        uint8_t setOn(uint8_t = AIN0, uint8_t = AIN1);
        void setOff(void);
        void enableInterrupt(void (*)(void), uint8_t tempMode = CHANGE);
        void disableInterrupt(void);
        uint8_t waitComp(unsigned long = 0);
    private:
        //private methods
};
extern analogComp analogComparator;

#endif
```

FIG. 9J

```
#include "Sleep_n0m1.h"

extern void displayBatteryLevels();
extern volatile unsigned int batteryISRcalled;

Sleep* Sleep::pSleep = 0;

Sleep::Sleep()
{
    pSleep = this;     //the ptr points to this object
    timeSleep = 0;    // total time due to sleep
    calibv = 1.0;  // ratio of real clock with WDT clock
    byte isrcalled = 0;      // WDT vector flag
    sleepCycleCount = 0;
    sleepCycleInterval = 100;

}
/*****************************************************************
*
*    setSleepMode
*
*****************************************************************/
void Sleep::setSleepMode(int mode)
{
   sleepMode_ = mode;
}
```

FIG. 9K

```
/****************************************************************
*
*    calibrateTime
*
****************************************************************/
void Sleep::calibrateTime(unsigned long sleepTime, boolean &abortCycle) {
  // timer0 continues to run in idle sleep mode
  set_sleep_mode(SLEEP_MODE_IDLE);
  long tt1=millis();
  sleepWDT(sleepTime,abortCycle);
  long tt2=millis();

calibv = (float) sleepTime/(tt2-tt1);

//Serial.println(calibv);
}

/****************************************************************
*
*    WDTMillis
*
****************************************************************/
unsigned long Sleep::WDTMillis() {
  return millis()+timeSleep;
}

/****************************************************************
*
*    sleepNow
*
****************************************************************/
void Sleep::sleepInterrupt(int interrupt,int mode) { if(mode == FALLING || mode == LOW)
  {
    int pin = interrupt + 2; //will fail on the mega
    pinMode (pin, INPUT);
    digitalWrite (pin, HIGH);
  }
```

FIG. 9L

```
    set_sleep_mode(sleepMode_); sleep_enable();
    attachInterrupt(interrupt,sleepHandler,mode);
    sei(); //make sure interrupts are on!
    sleep_mode();
        //------------------------------ ZZZZZZ sleeping here----------------------
    sleep_disable(); //disable sleep, awake now
    detachInterrupt(interrupt);
}

/*******************************************************************
 *
 *    sleepDelay
 *
 *******************************************************************/
void Sleep::sleepDelay(unsigned long sleepTime){ boolean abortCycle = false;

sleepDelay(sleepTime,abortCycle);
}
/*******************************************************************
 *
 *    sleepDelay
 *
 *******************************************************************/
void Sleep::sleepDelay(unsigned long sleepTime, boolean &abortCycle) {
    ADCSRA &= ~(1<<ADEN);     // adc off
    // PRR = 0xEF; // modules off ++sleepCycleCount;
    sleepCycleCount = sleepCycleCount % sleepCycleInterval; //recalibrate every interval
        cycles
    if(sleepCycleCount == 1)
    {
      calibrateTime(sleepTime,abortCycle);
    }
```

FIG. 9M

```
  else
  {
    set_sleep_mode(sleepMode_);
    int trem = sleepWDT(sleepTime*calibv,abortCycle);
    timeSleep += (sleepTime-trem);
  }
  // PRR = 0x00; //modules on
  ADCSRA |= (1<<ADEN); // adc on
}

/****************************************************************
 *
 *   sleepWDT
 *
 ****************************************************************/
int Sleep::sleepWDT(unsigned long remainTime, boolean &abortCycle) { if defined(WDP3)
    byte WDTps = 9; // WDT Prescaler value, 9 = 8192ms
  #else
    byte WDTps = 7; // WDT Prescaler value, 7 = 2048ms
  #endif isrcalled = 0;
  sleep_enable();
  while(remainTime > 0)
  {
    //work out next prescale unit to use
    while ((0x10<<WDTps) > remainTime && WDTps
      > 0) { WDTps--;
    }
    // send prescaler mask to WDT_On
    WDT_On((WDTps & 0x08 ? (1<<WDP3) : 0x00) | (WDTps & 0x07));
    isrcalled=0;
    while (isrcalled==0 && abortCycle == false) {
```

FIG. 9N

```
#if defined(__AVR_ATmega328P__)
// turn bod off
MCUCR |= (1<<BODS) | (1<<BODSE);
MCUCR &= ~(1<<BODSE);// must be done right before sleep
#endif
sleep_cpu();   // sleep here //if(batteryISRcalled)displayBatteryLevels();
if(batteryISRcalled)remainTime=0;
}
// calculate remaining time
remainTime -=
(0x10<<WDTps);
if ((long) remainTime < 0 ) {remainTime = 0;} //check for unsigned underflow, by
   converting to signed } sleep_disable();
return
remainTime;
}

/******************************************************************
*
*   WDT_On
*
******************************************************************/
```

FIG. 9O

```
void Sleep::WDT_On(byte psMask)
{
  // prepare timed sequence first
  byte ps = (psMask | (1<<WDIE)) & ~(1<<WDE);
  cli();
  wdt_reset();
  /* Clear WDRF in
  MCUSR */ MCUSR &=
  ~(1<<WDRF);
  // start timed sequence
  WDTCSR |= (1<<WDCE) | (1<<WDE);
  // set new watchdog timeout value
  WDTCSR = ps;
  sei();
}

/*****************************************************************
 *
 *   WDT_Off
 *
 *****************************************************************/
void Sleep::WDT_Off() {
  cli();
  wdt_reset();
  /* Clear WDRF in
  MCUSR */ MCUSR &=
  ~(1<<WDRF);
  /* Write logical one to WDCE and WDE */
  /* Keep old prescaler setting to prevent unintentional time-out */
  WDTCSR |= (1<<WDCE) | (1<<WDE);
  /* Turn off WDT */
  WDTCSR = 0x00;
  sei();
}

/*****************************************************************
 *
 *   sleepHandler ISR
 *
 *****************************************************************/
```

FIG. 9P

```
void sleepHandler(void)
{

}
/***********************************************************
 *
 *   WDT ISR
 *
 ***********************************************************
*********/ ISR(WDT_vect) {
  Sleep::pSleep->WDT_Off();
  Sleep::pSleep->isrcalled=1;
}
```

FIG. 9Q

```
#ifndef SLEEP_H
define SLEEP_H include <avr/sleep.h>
include <avr/wdt.h>
#if defined(ARDUINO) && ARDUINO >= 100
#include "Arduino.h"
#else
#include "WProgram.h"
endif extern "C" void WDT_vect(void) __attribute__
((signal));
 extern "C" void sleepHandler(void) __attribute__
((signal));

class Sleep { public:

friend void WDT_vect(void);
    friend void sleepHandler(void);

Sleep();

/* modes of sleep
    SLEEP_MODE_IDLE
    SLEEP_MODE_ADC
    SLEEP_MODE_PWR
    _SAVE
    SLEEP_MODE_EXT_
    STANDBY
    SLEEP_MODE_STA
    NDBY
    SLEEP_MODE_PWR
    _DOWN
  */
```

FIG. 9R

```
//-----------------------------------------------------
// Description: sets the Arduino into idle Mode sleep,
// the least power saving, The idle mode stops the MCU
// but leaves peripherals and timers running.
//-----------------------------------------------------
void idleMode() { setSleepMode(SLEEP_MODE_IDLE);}

//-----------------------------------------------------
// Description: sets the Arduino into adc Mode sleep,
// This mode makes the MCU enter ADC Noise Reduction mode,
// stopping the CPU but allowing the ADC, the external interrupts,
// the 2-wire Serial Interface address watch, Timer/Counter2
// and the Watchdog to continue operating.
//-----------------------------------------------------
void adcMode() {setSleepMode(SLEEP_MODE_ADC);}

//-----------------------------------------------------
// Description: sets the Arduino into power Save Mode sleep,
// The timer crystal will continue to operate in this mode,
// Timer2 still active.
//-----------------------------------------------------
void pwrSaveMode() {setSleepMode(SLEEP_MODE_PWR_SAVE);}

//-----------------------------------------------------
// Description: sets the Arduino into extStandby Mode sleep,
// This mode is identical to Power-save with the exception
// that the Oscillator is kept running for fast wake up
//-----------------------------------------------------
void extStandbyMode(){setSleepMode(SLEEP_MODE_EXT_STANDBY);}

//-----------------------------------------------------
// Description: sets the Arduino into standby Mode sleep,
// This mode is identical to Power-down with the exception
// that the Oscillator is kept running for fast wake up
//-----------------------------------------------------
void standbyMode(){setSleepMode(SLEEP_MODE_STANDBY);}

//-----------------------------------------------------
// Description: sets the Arduino into power Down Mode sleep,
// The most power saving, all systems are powered down
// except the watch dog timer and external reset
```

FIG. 9S

```
//--------------------------------------------------------
void pwrDownMode(){setSleepMode(SLEEP_MODE_PWR_DOWN);}

//--------------------------------------------------------
// Description: Works like the Arduino delay function, sets the
// Arduino into sleep mode for a specified time.
// Parameters: (unsigned long) time in ms of the sleep cycle
//--------------------------------------------------------
void sleepDelay(unsigned long sleepTime);

//--------------------------------------------------------
// Description: Works like the Arduino delay function, sets the
// Arduino into sleep mode for a specified time.
// Parameters: (unsigned long) time in ms of the sleep cycle
//             (boolean) prevents the Arduino from entering sleep
//--------------------------------------------------------
void sleepDelay(unsigned long sleepTime,boolean &abortCycle);

//--------------------------------------------------------
// Description: the WDT needs to be calibrated against timer 0
// periodically to keep the sleep time accurate. Default calibration
// occurs every 100 wake/sleep cycles. recalibrate too often will
// waste power and too rarely will make the sleep time inaccurate.
// Parameters: (int) set the # of wake/sleep cycles between calibrations
//--------------------------------------------------------
void setCalibrationInterval(int interval){ sleepCycleInterval = interval; }

//--------------------------------------------------------
// Description: set the Arduino into sleep mode until an interrupt is
// triggered. The interrupts are passed in as parameters
// Parameters: (int) interrupt value, 0, 1, etc, see attachInterrupt()
//             (int) mode of trigger, LOW,RISING,FALLING,CHANGE
//--------------------------------------------------------
void sleepInterrupt(int interrupt,int mode);
```

FIG. 9T

```
private:

int sleepMode_;
    unsigned long timeSleep;
    float calibv;
    volatile byte isrcalled;
    static Sleep* pSleep; //static ptr to Sleep class for the ISR
    int sleepCycleCount;
    int sleepCycleInterval;

void setSleepMode(int mode);
    void WDT_Off();
    void WDT_On(byte psMask);
    int sleepWDT(unsigned long remainTime,boolean &abortCycle);
    void calibrateTime(unsigned long sleepTime,boolean &abortCycle); //calibrate the
        time keeping difference between WDT and Timer0
    unsigned long WDTMillis();   // Estimated millis is real clock + calibrated sleep
        time

};

#endif
```

FIG. 9U

… # AUTOMATED PROGRAMMABLE BATTERY BALANCING SYSTEM AND METHOD OF USE

CROSS-REFERENCE TO RELATED APPLICATIONS

This application is a continuation of U.S. patent application Ser. No. 15/185,874 filed on Jun. 17, 2016, now U.S. Pat. No. 10,263,455, which is hereby incorporated by reference herein.

FIELD OF THE DISCLOSURE

The present invention relates generally to the control units for chemical pumps at oil well pump jacks and more particularly to a device which enables adjustment of power supplies from two or more batteries and to monitor the conditions of each battery at each well site for status information and transmission of such information through an economical text message format to an operator.

BACKGROUND OF THE DISCLOSURE

In the production phase of an oil well, it is usually necessary to artificially lift the crude oil from its natural level in the wellbore to the wellhead. The two most common lift methods are to use either a surface pumping unit or a subsurface rotary pump. A familiar sight in the oil fields around the world is the conventional beam pumping unit (pump jack). This method of bringing oil to the surface accounts for between 70% to 80% of the artificial lifting of oil. The pumping unit may be powered by either an electric motor or an internal combustion engine. In either case it is usually necessary to couple the motor and pump through a speed reducer. A reduction of 30 to 1 is typically needed to operate the pump at 20 strokes per minute (spm). The rotation of the prime mover is converted into an up-and-down motion of the beam and horse head through a pitman/crank assembly. The oscillating horse head of the pumping unit raises and lowers a sucker rod and reciprocates the sucker rod pump in the wellbore. This action lifts the oil on the upstroke to the wellhead.

During production it is often necessary to inject a treatment chemical into the annular space between the well casing and tubing. These might include demulsifiers, corrosion inhibitors, scale inhibitors, paraffin inhibitors, etc. Demulsifiers are chemicals used to dehydrate crude oil containing emulsified water. In many cases this water-in-oil emulsion is very stable. Without the use of a demulsifier, the water would not separate from the crude oil. The rapid separation of the water from the oil phase may be necessary at the well site because of limited storage capacity. The combined total of water remaining in the crude oil must be below 1% in most cases. Excess water can cause serious corrosion problems in pipelines and storage tanks. In addition, water in a refinery stream can interfere with the distillation process and damage the refinery equipment.

In wells which use a production pumping unit, a small chemical pump may be used to inject the treatment chemical into the wellhead. Several types of chemical pumps are known in the art. For example, a pneumatically powered system creates motor force by utilizing compressed air or gas to power a motor. The motor applies forces to a plunger or diaphragm which in turn inject chemical into the well at a measured rate. Another example is electrically powered systems. These systems create motor force by utilizing municipal electricity to power an electrical motor. The motor applies force to a plunger or diaphragm which in turn injects the chemical. A variant of the electrically powered system is a solar powered system which utilizes solar cells to create electricity. The electrical current is stored in a battery bank which in turn powers a DC electric motor. Sealed gel or a matted glass batteries are required due to deep cycle requirements of the environment. Furthermore, these systems must be designed to operate without sunlight for extended periods of time up to thirty days in locations such as Canada, Northern Russia or the Artic.

In solar powered systems extended delays without sunlight due to cloudy weather or location can create a problem for maintaining battery voltage and therefore proper chemical injection rate.

It is therefore extremely important to provide reliable battery service for chemical injection pumps for pump jacks. However, as with other mechanical systems of the pump jack, routine maintenance is required to assure battery performance. The routine maintenance is difficult to provide because the battery usage varies widely from installation to installation. In the prior art, to assure battery performance an operator is required to periodically travel to the installation and test the batteries to prevent failure. Repeated travel to the installation raises costs and reduces profit. Similarly, neglected batteries can easily cause injection failure with concomitant losses in production or efficiency.

SUMMARY OF THE DISCLOSURE

The present disclosure provides a programmable controller for monitoring battery performance and usage at a remote pump jack location. The disclosure provides an energy efficient controller and display system which allows the operator to quickly and accurately test batteries in an installation. It uses programmable logic to switch between system modes and decide which battery supplies power to the output. Further it will sense any high voltages at and disable the input from the faulty source. Further, the programmable logic is designed such that the mode selection process is automatic when the system is in operation. The purpose is to elongate battery and connected equipment life by preventing battery failure. The present disclosure also provides an easy and economical method of communicating potential battery failure and status to an operator via cell phone communication.

BRIEF DESCRIPTION OF THE DRAWINGS

FIG. 4 is a schematic of the sensing control circuit of a preferred embodiment of the present disclosure.

FIG. 6A is a flowchart of the system functions of a preferred embodiment.

FIG. 6B is a flowchart of a status interrupt request of a preferred embodiment.

FIG. 6C is a flowchart of a system communication interrupt request of a preferred embodiment.

FIG. 7A is a preferred embodiment of a look up table of a preferred embodiment.

FIG. 7B is a preferred embodiment of a look up table of a preferred embodiment.

FIGS. 8A-8V are a preferred embodiment of a software program stored in memory of the microcontroller circuit.

DETAILED DESCRIPTION

Figure 1:
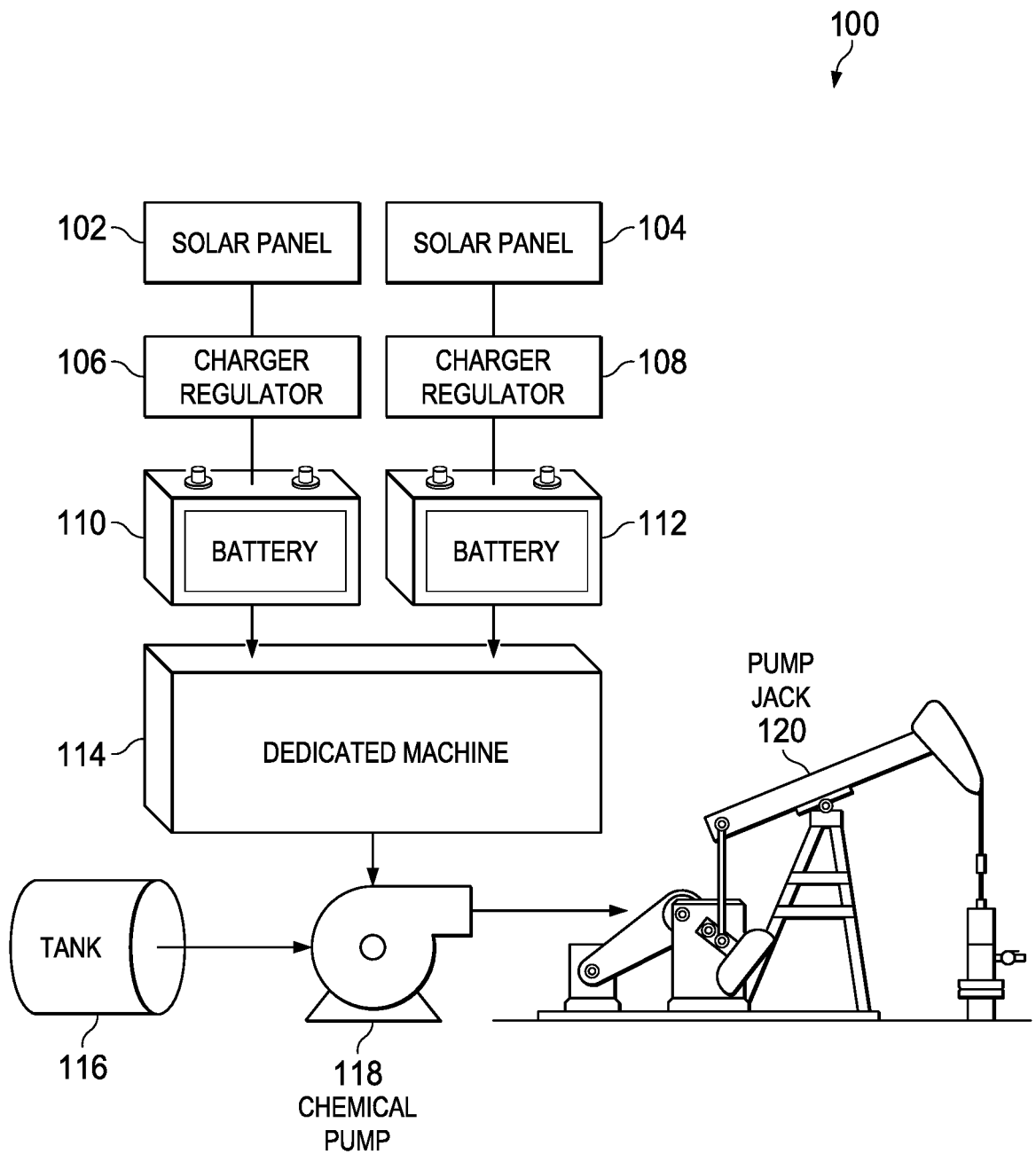
FIG. 1 is a schematic of a dedicated control system for a chemical pump in place at a pump station.

Referring then to FIG. 1 a preferred embodiment of system 100 will be described. Solar panel 102 and 104 are connected to charger regulators 106 and 108 respectively. The solar panels in a preferred embodiment are 80 watt solar panels which generate less than 20 volts a piece. Charger regulators 106 and 108 are capable of transferring approximately 14 volts to each battery and serve to regulate the output from the solar panels. Battery 110 and battery 112 are connected to charger regulators 106 and 108, respectively. In a preferred embodiment the batteries are sealed gel deep cycle storage batteries suitable for solar applications.

Batteries 110 and 112 are connected to dedicated machine 114 which will be further described. Dedicated machine 114 directly powers chemical pump 118. Chemical pump 118 distributes chemicals from tank 116 to pump jack 120, at the well head.

Figure 2:
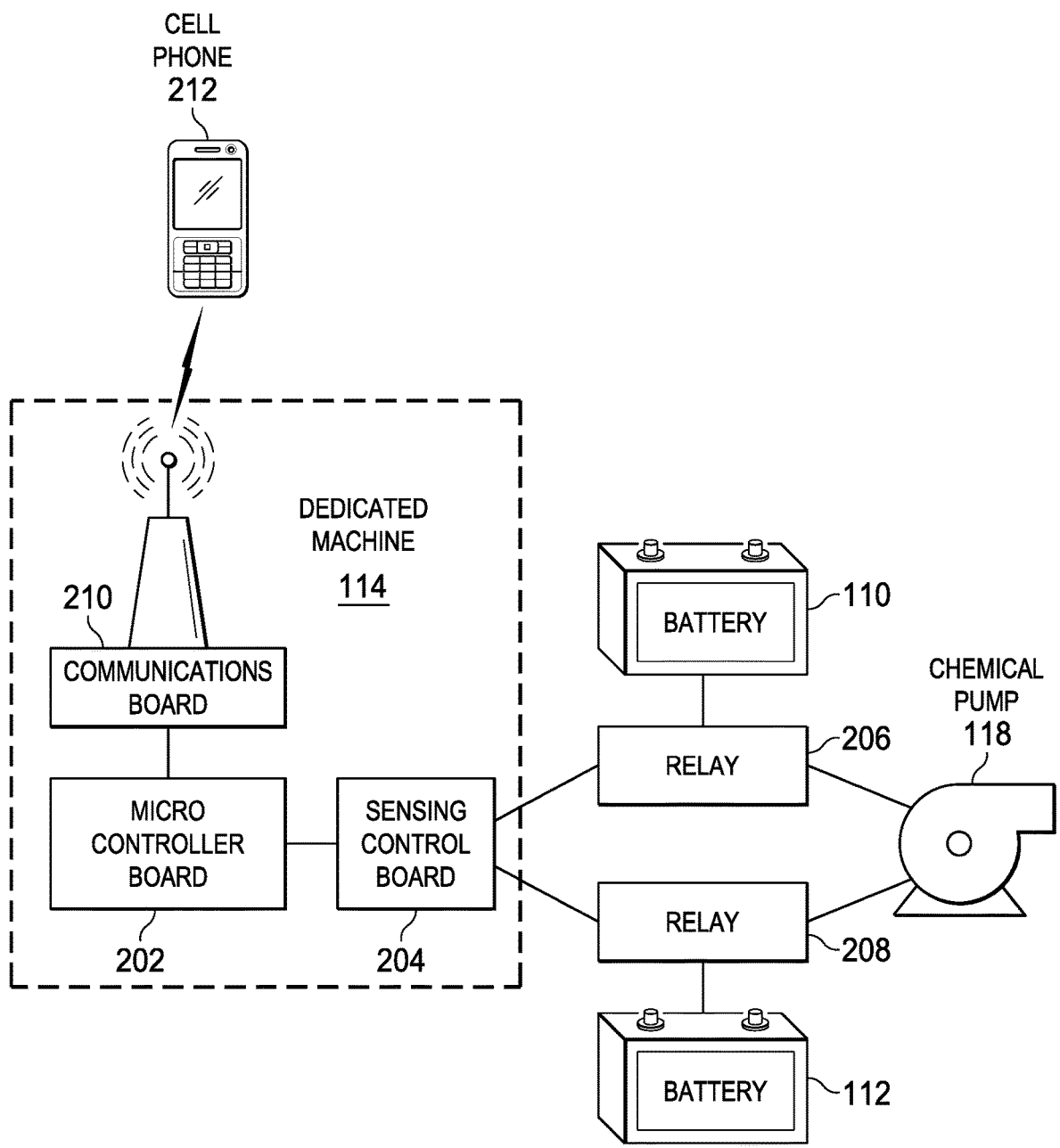
FIG. 2 is a schematic view of the components of a preferred embodiment of the present disclosure.
Figures 3, 3A:
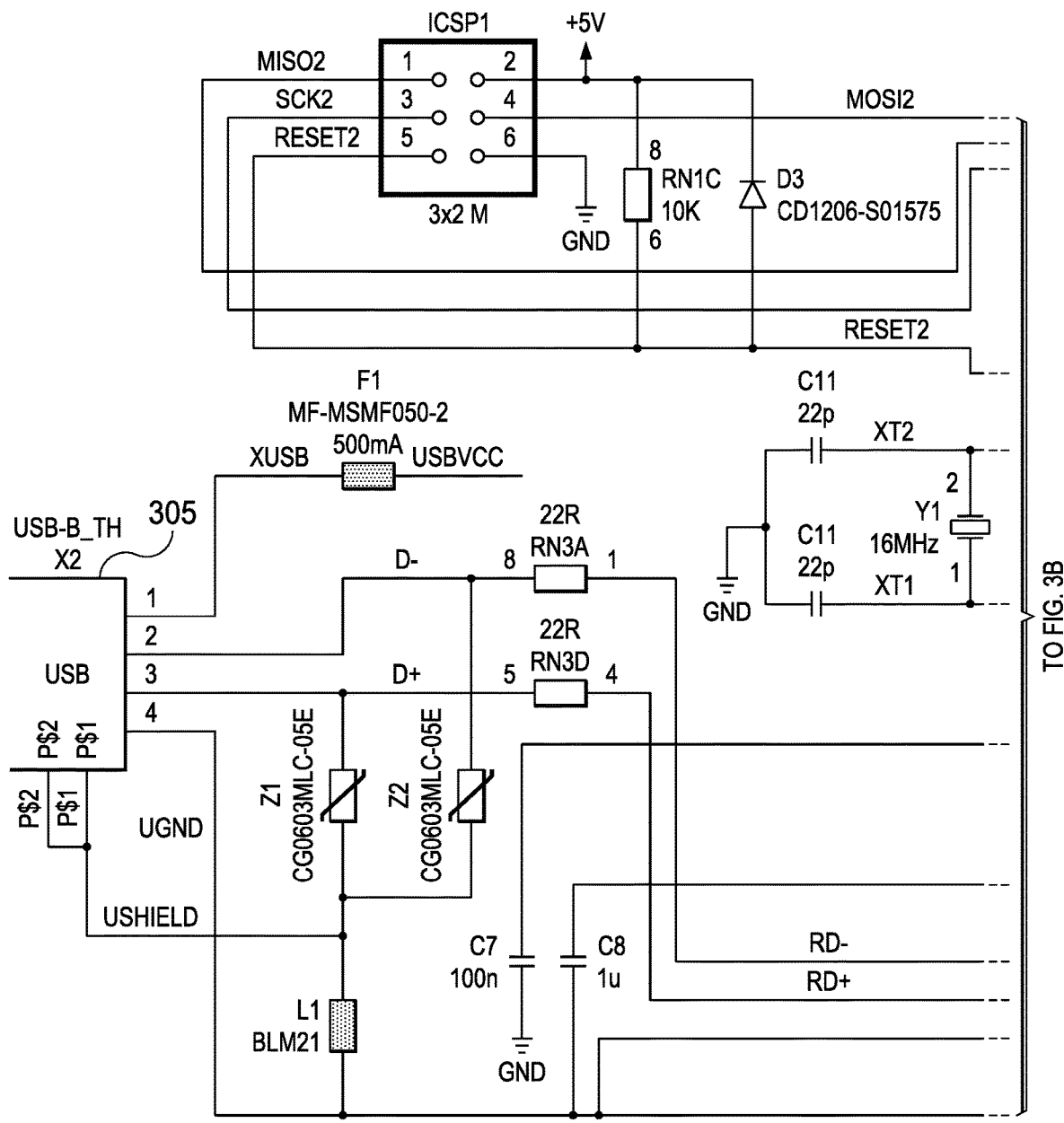
FIG. 3 is a schematic of the microcontroller circuit of a preferred embodiment of the present disclosure.
FIGS. 3A-3D is a schematic of the microcontroller circuit of a preferred embodiment of the present disclosure.
Figure 3B:
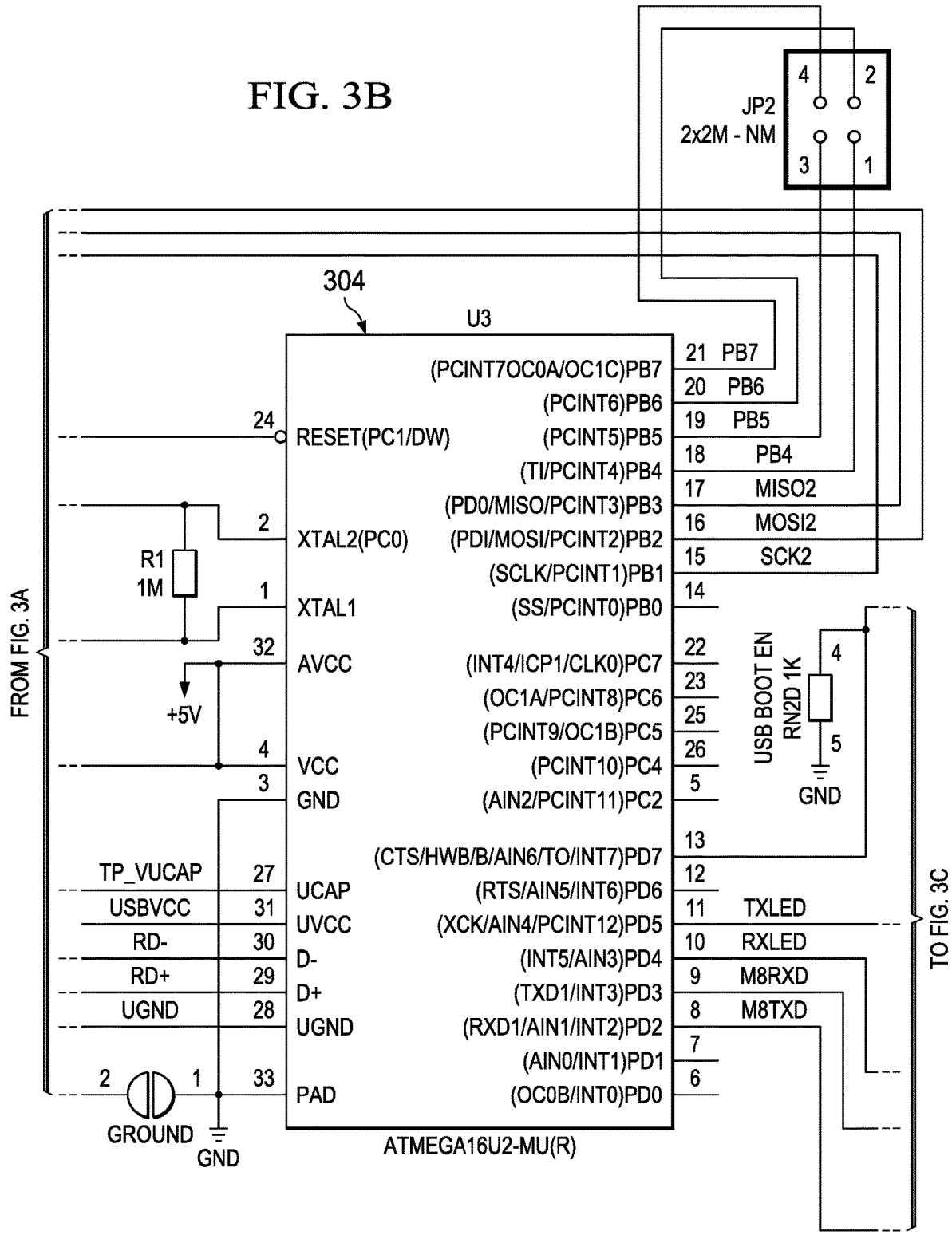
Figure 3C:
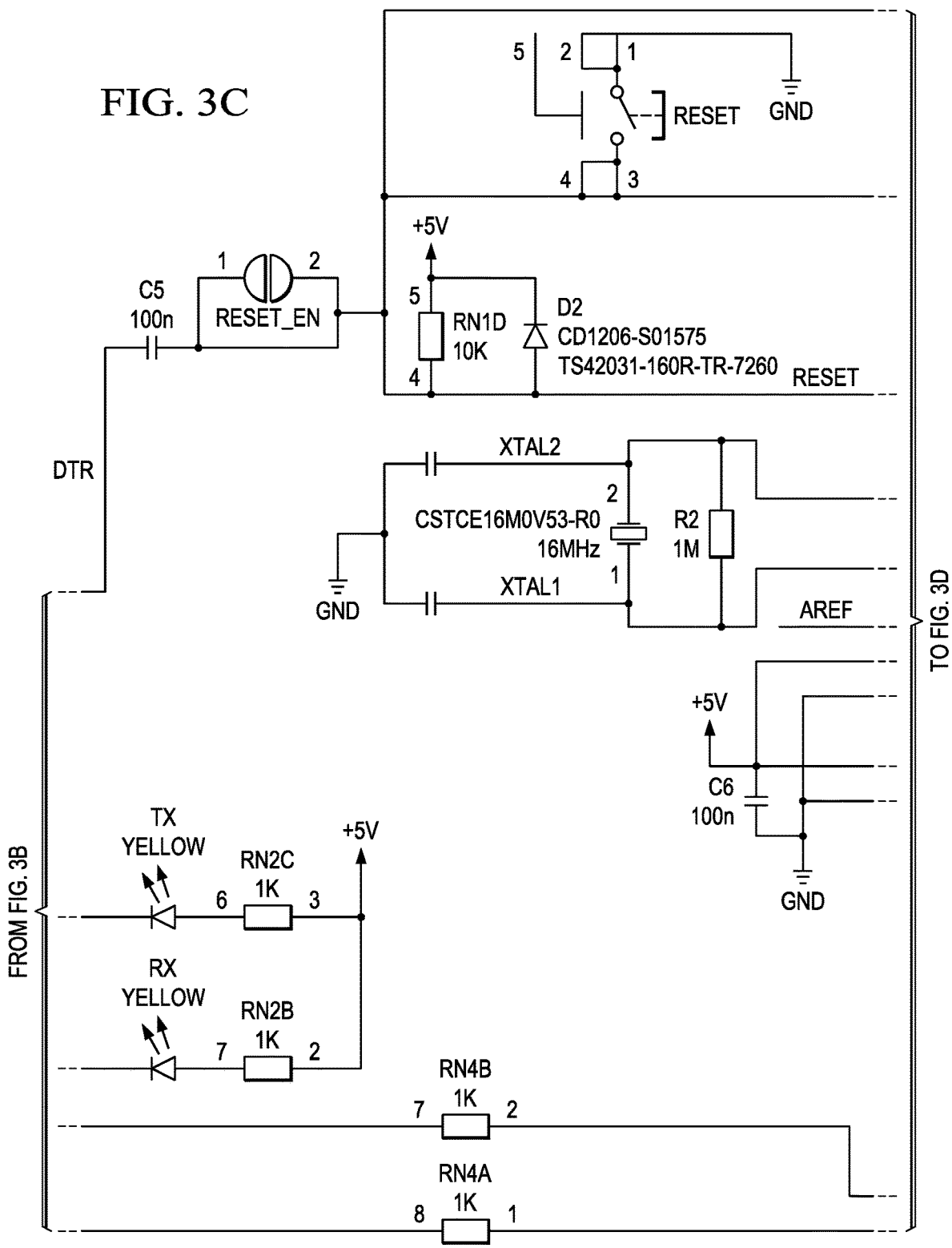
Figure 3D:
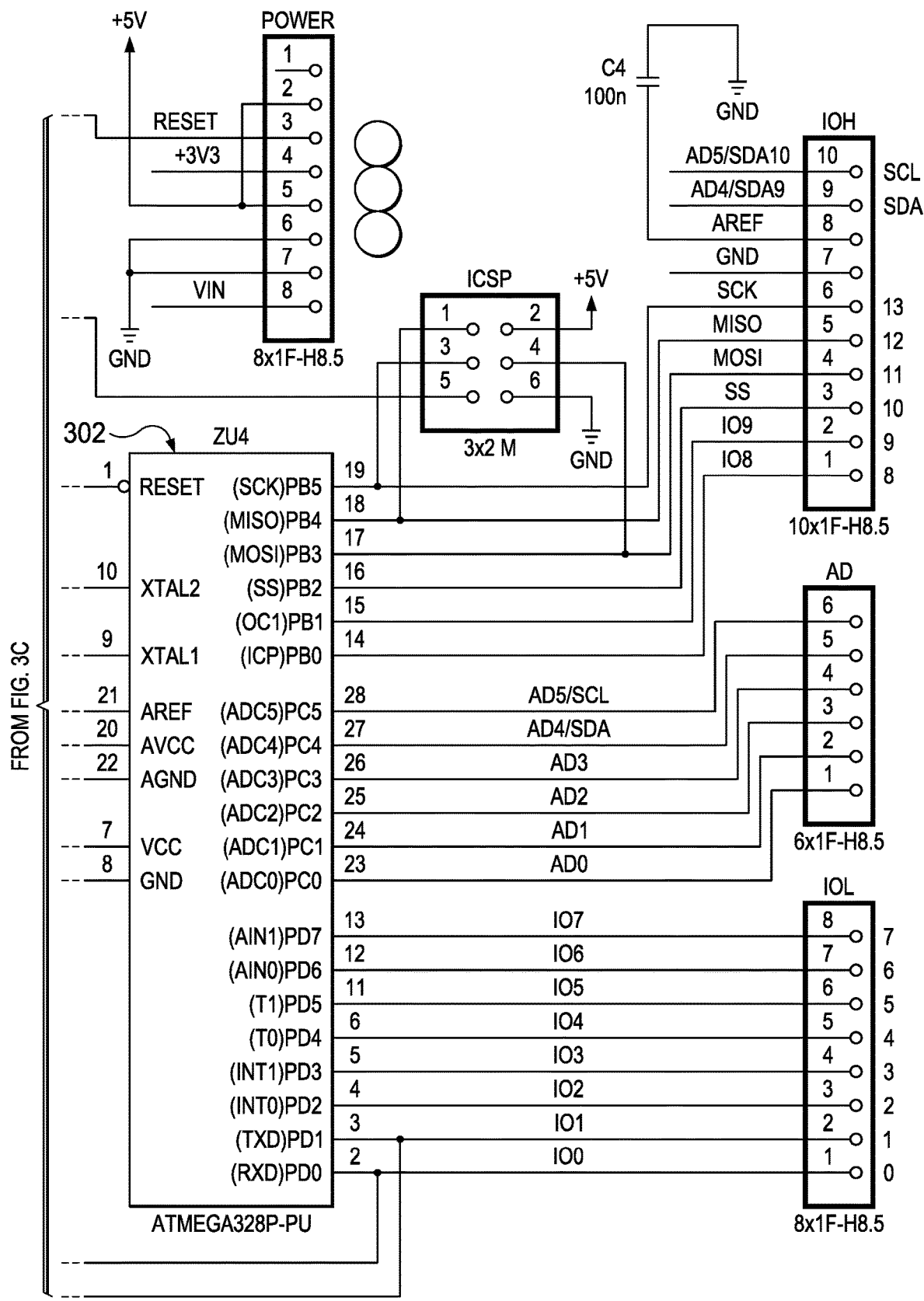

Referring then to FIG. 2 dedicated machine 114 further includes microcontroller board 202 connected to or integrated with a sensing control board 204. The sensing control board is connected to relay 206 and relay 208. Relay 206 is connected to battery 110. Similarly, relay 208 is connected to battery 112. The relays are connected to the chemical pump 118 and, when activated, distribute electrical power from the batteries to the chemical pump. The microcontroller board is also connected to a communications board 210. The communications board that is periodically connected to cell phone 212 through a cellular network (not shown).

Referring then to FIGS. 3A-3D, the schematic of microcontroller board 202 will be described. The microcontroller board includes two separate processors, processor 302 and processor 304. Processor 304 is used to receive and store programming instructions from USB port 305 as will be further described. The programming instructions are passed to processor 302 through jumpers between Port B of processor 304 and Port B of processor 302, where they are stored in Flash memory. Processor 302 receives analog input related to battery voltages through Port C at inputs AD0 through AD5 located at pins 23 through 28. Processor 302 communicates output voltages through Port D labeled IO0 through IO7 located at pins 2, 3, 4, 5, 6, 11, 12, and 13.

In the preferred embodiment, processor 302 is Atmega328p-pu microcontroller available from Atmel Corporation, San Jose, Calif. Processor 304 is the Atmega16u2-um(r) microcontroller also available from Atmel Corporation. In another preferred embodiment, both processors are available in an integrated package, Arduino 3 available from Adafruit Industries of New York, N.Y. (or other supplier).

Figure 4A:
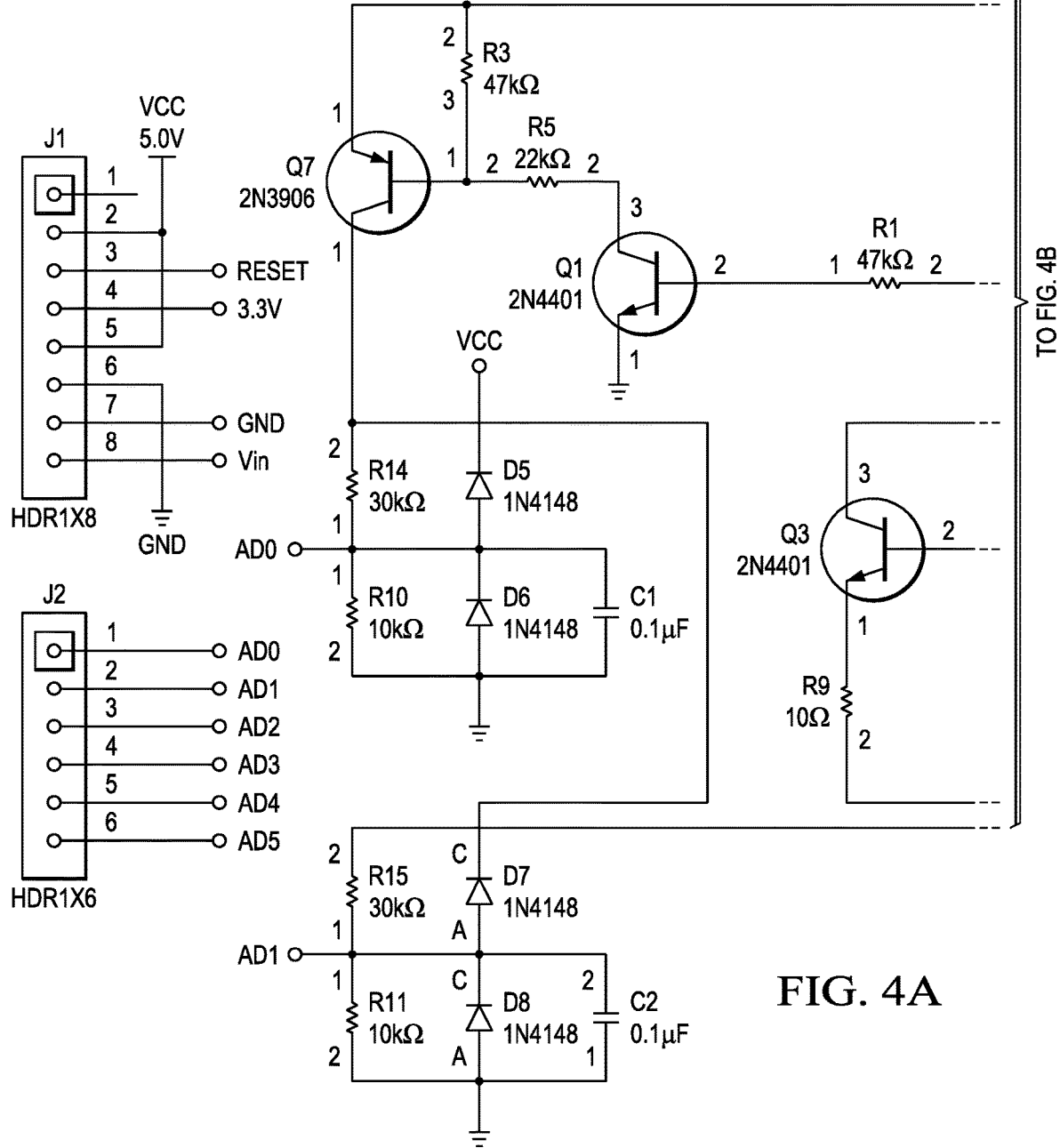
FIGS. 4A-4C is a schematic of the sensing control circuit of a preferred embodiment of the present disclosure.
Figure 4B:
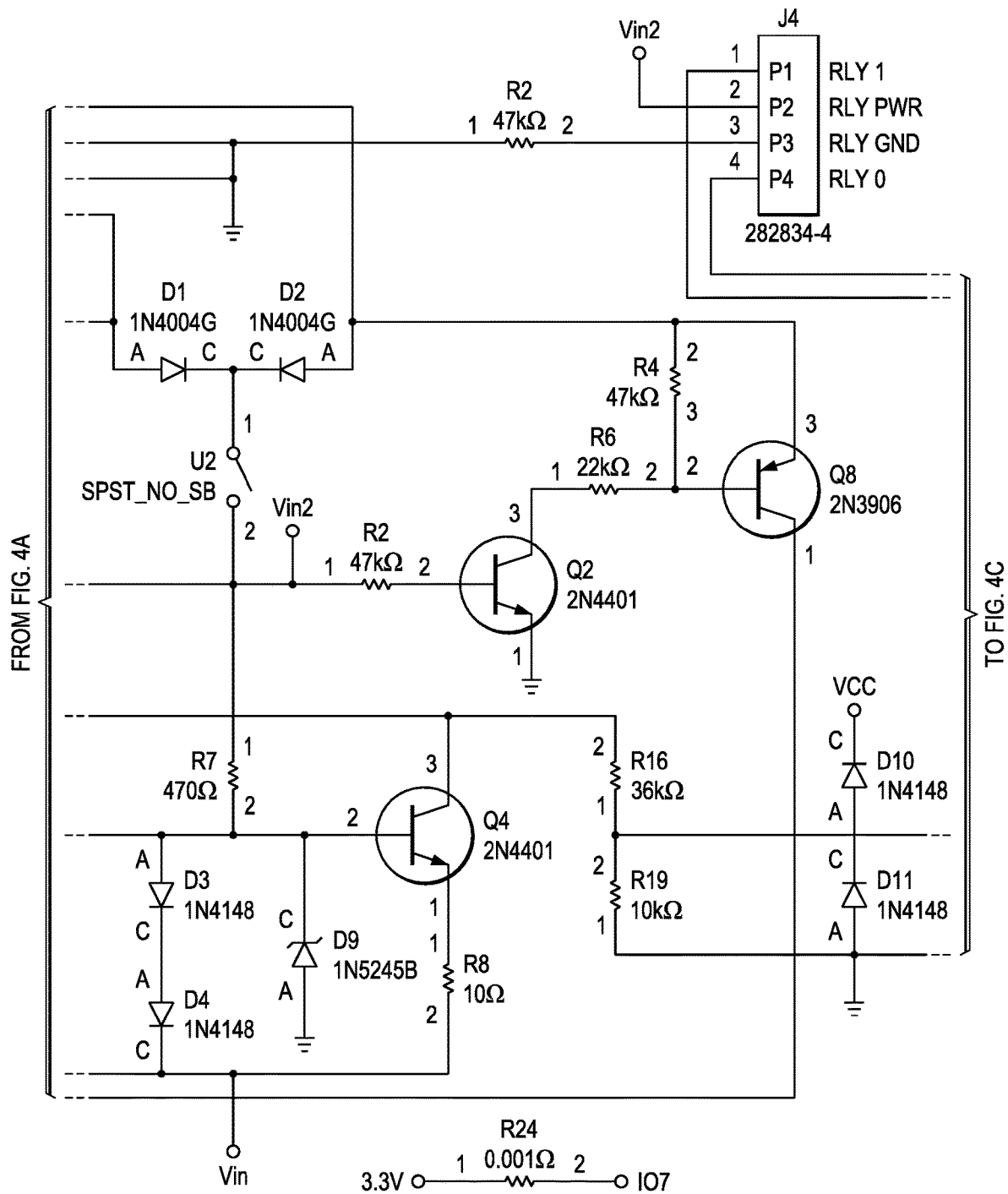
Figure 4C:
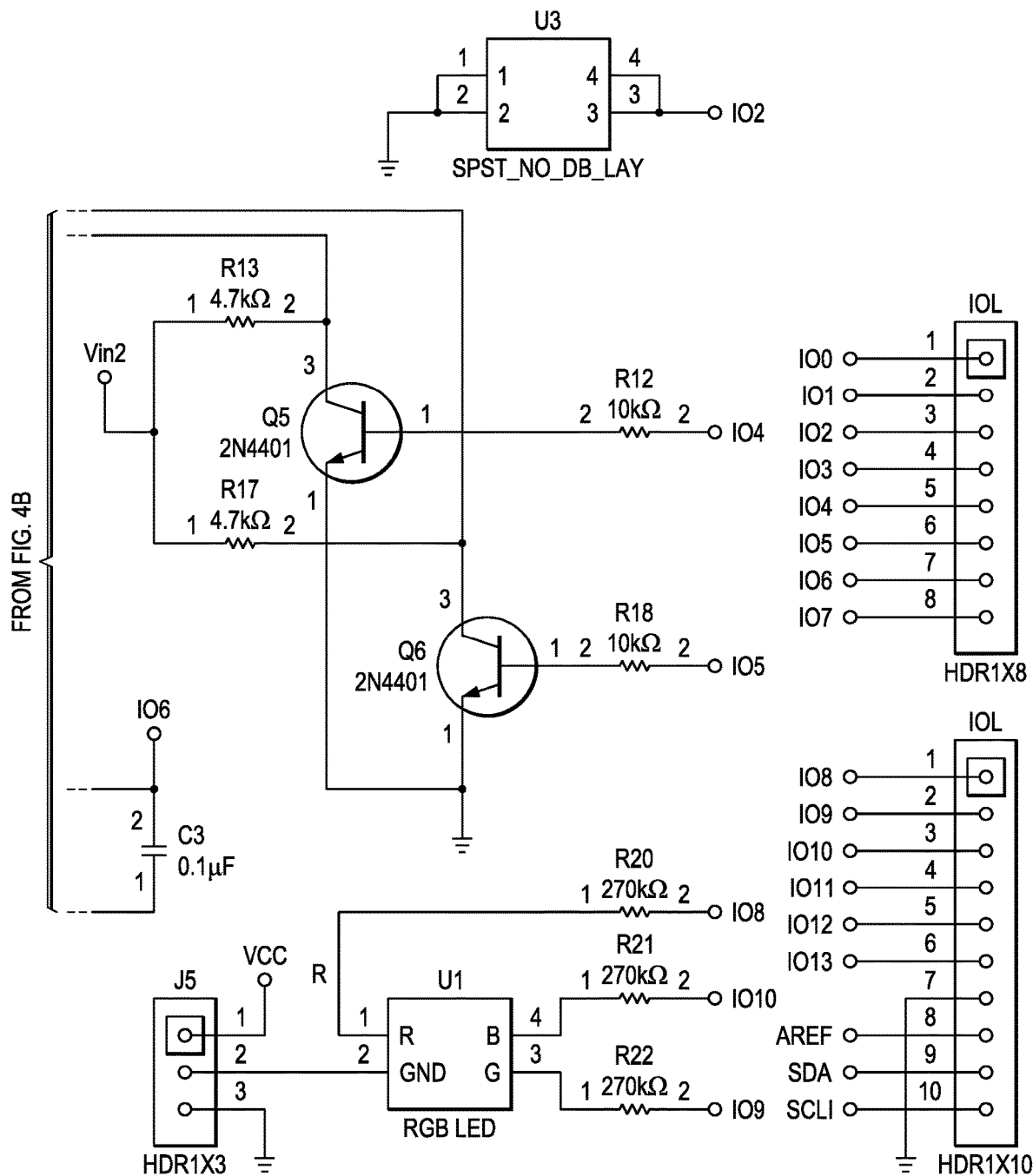

Referring then to FIGS. 4A-4C, the sensing control board will be further described. Sensing control board 204 is connected to the microcontroller board via connectors J1 and J2. Connector J1 provides VCC, RESET, GROUND and VIN signals. Connector J2 provides access to the analog Port D through pins 1 through 6 labeled AD0 through AD5. VIN voltage signal supplies the microcontroller and sensor board with power.

Input/output is provided through connectors IOL and IOH labeled IO0 through IO7 and IO8 through IO13, respectively. AREF is the analog reference pin for the Analog-to-Digital converter (ADC) of the microcontroller.

Connector J4 is connected to relay 206 at pin 1 and relay 208 at pin 4. Pin 3 of the connector is attached to ground. Pin 2 of the connector is attached to control voltage VIN2 and is used to power the relays ON and OFF. Pin 1 is also connected to the collector of Q5 and the collector of Q6. The emitter of Q5 and Q6 both are tied together and then to ground. The collector of Q5 and Q6 are also tied to the control voltage VIN2 through voltage control resistors R13 and R17, respectively. The base of Q5 is tied to IO04 through voltage control resistor R12. The base of Q6 is tied to IO05 through voltage control resistor R18. VIN2 voltage signal supplies the relays and relay control circuits with power directly from the batteries, thereby isolating the relay circuits from the microprocessor control board power circuit.

When IO4 goes high, Q5 is activated bringing pin 4 of J4 low. When pin J4 goes low, relay 1 is activated and battery 110 is connected to the load. When I04 goes low, Q4 is deactivated bringing pin 4 of J4 to control voltage VIN2. When pin 4 is at control voltage VIN2, relay 1 is deactivated thereby disconnecting the battery from the load.

Similarly, when IO05 is high, Q6 is activated, bringing pin 1 to ground. When pin 1 is at ground, relay 2 is activated, thereby connecting battery 112 to the load. When IO5 is low, Q6 is deactivated bringing pin 1 of J4 to control voltage VIN2. When pin 1 is at VIN2, relay 2 is deactivated and battery 112 is disconnected from the load.

Connector 3 is attached to the battery and to ground. Pin 1 of connector 3 is connected to the positive side of battery 112. Pin 2 of connector 3 is attached to ground. Pin 3 of connector 3 is connected to ground. Pin 4 of J3 is connected to the positive terminal battery 110. Both negative terminals of battery 112 and battery 110 are connected to ground.

Pin 1 of J3 is also connected through diode D2 to one terminal of single pole single throw switch U2. Pin 1 of J3 is also connected to the emitter of transistor Q8. The collector of transistor Q8 is connected to the voltage divider made up of R15 and R11. At the midpoint of the voltage divider comprised of R15 and R11, a connection is made to analog input AD1. AD1 is tied to a stabilizing network comprised of R11 and C2 through diode D7 to supply voltage VCC. The base of Q8 is also tied through voltage control resistor R6 to the collector of Q2. The emitter of Q2 is tied to ground. The collector of Q2 is tied through voltage control resistor R2 to control voltage VIN2.

In a similar way, pin 4 of J3 is also connected through diode D1 to one terminal of single pole single throw switch U2. Pin 4 is also tied to the emitter side of Q7. The base of Q7 is connected through voltage control resistor R5 to the collector Q1. The emitter of Q1 is tied to ground. The collector of Q7 is connected to one side of the voltage divider comprised of resistors R14 and R10. At the midpoint of the voltage divider a connection is made to analog input AD0. AD0 is connected through a stabilizing network comprised of resistor R10, diode D6, and capacitor C1 through diode D5 to supply voltage VCC.

The second terminal of single pole single throw switch U2 is connected through voltage control resistor R1 to the base of Q2. In the same way, the second terminal of single pole single throw switch U2 is connected through voltage control resistor R2 to the base of Q2. The second terminal is also connected to the control voltage VIN2. The second terminal is also connected to the collectors of Q3 and Q4. The emitter of Q4 is tied through voltage control resistor R9 to power voltage VIN. The emitter of Q4 is tied through voltage control resistor R8 also to control voltage Vin. The bases of Q3 and Q4 are tied to stabilizing diodes D3 and D4 and stabilizing Zener diode D9 to ground.

In a similar way, the collectors of Q3 and Q4 are connected to stabilizing network comprised of R16, R19, D1, D11, and C3. R16 and R19 form a voltage divider. At the midpoint of this voltage divider, a signal is drawn and connected to IO6. IO6 and IO7 are the inputs for the analog comparator module of the processor. IO7 is connected to the 3.3V reference voltage pin. IO6 is R19/(R16+R19) of the battery voltage and under normal operation will be lower than the 3.3V IO7 reference voltage. In case of charge controller failure, the IO6 voltage will be higher than IO6 triggering the analog reference interrupt on the processor.

Connector J5 is joined at pin 1 to supply voltage VCC. At pin 3, the connector is attached to GROUND. At pin 2, the connector is joined to color RGBLED U1. The control signals for red are connected through resistor R20 to IO8, for blue through resistor 21 to IO10, and for green through R22 to IO9. This jumper allows the choice of the color RGBLED to be common cathode or common anode variety.

Push-button spring loaded switch U3 is connected at one terminal to ground and at the other to IO2. The switch is used to initiate a signal interrupt which activates the function of the color RGBLED U1.

In operation, switch U2 is used as an "ON-OFF" switch which activates sensing control board 204, microcontroller board 202 and communications board 210. When the switch is in the "OFF" position, terminal 1 is connected to the high side of both battery 110 and battery 112 through jumper J3. Isolation diodes D1 and D2 prevent a short circuit. The collector of both Q1 and Q2 are both effectively low due to the isolation effect of diodes of D3 and D4. As a result, the base of Q7 and Q8 are drawn high through voltage control resistors R3 and R4. In this state, both Q7 and Q8 do not conduct and the outputs AD0 and AD1 are effectively low or float. In the same way, IO6 is drawn low through R19 to ground.

When U2 is closed, current moves through isolation diodes D1 and D2 through resistors R1 and R2 to the bases of Q1 and Q2. Both transistors are energized thereby setting the bases of Q7 and Q8 to ground. When set to ground, Q7 and Q8 conduct and voltages AD0 and AD1 reflect the voltages of battery 110 and battery 112, respectively. In a similar way, the voltage divider comprised of R16 and R19 is energized and IO6 drawn high. When U2 is closed, the positive sides of battery 112 and battery 110 also energize the bases of Q3 and Q4 through voltage control resistor R7. Current flow from the collectors of Q3 and Q4 to VIN thereby energizes the system.

Figure 5:
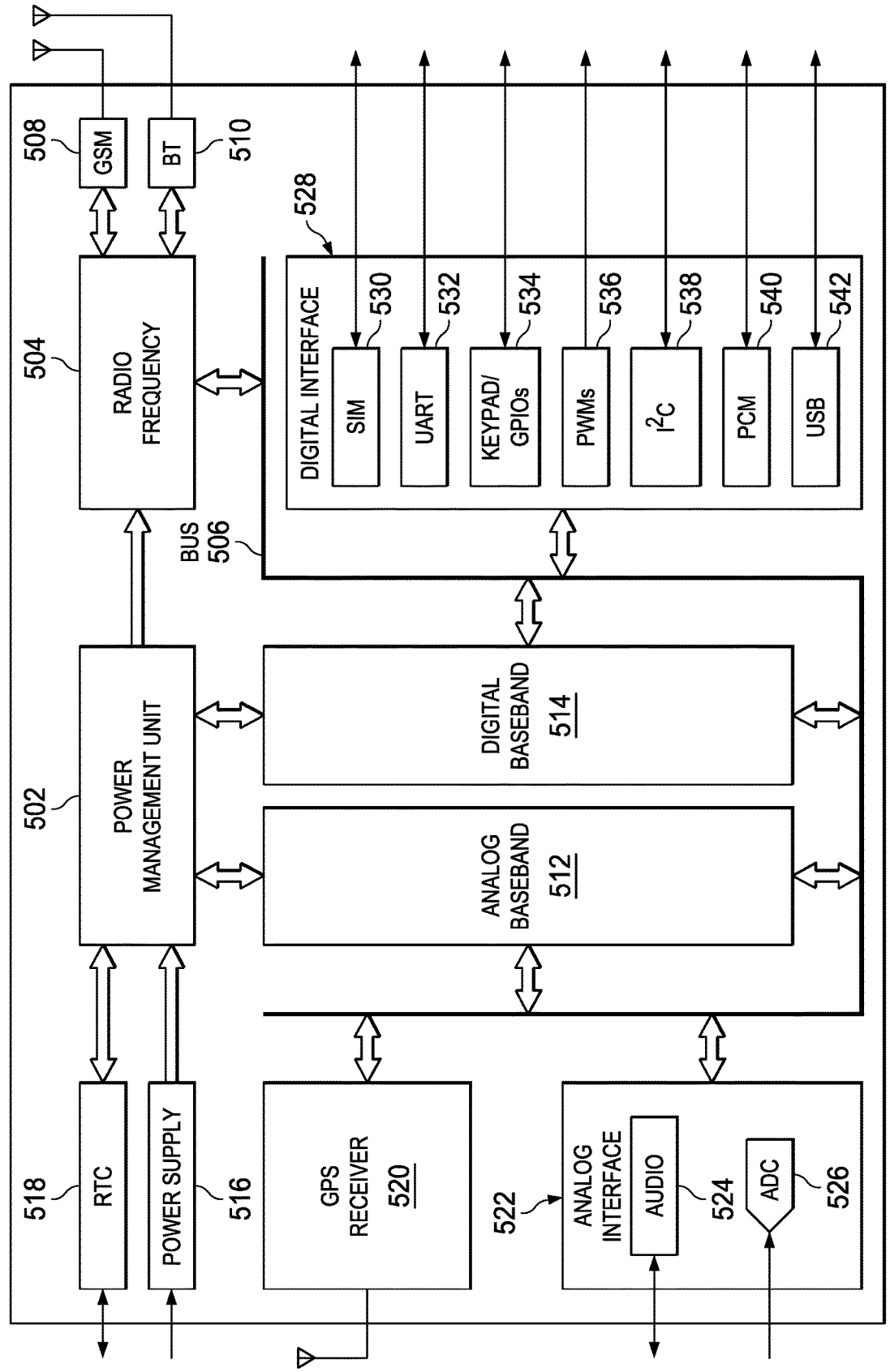
FIG. 5 is a schematic diagram of a communications board of a preferred embodiment of the present disclosure.
Figure 9G:
FIGS. 9A-9U are preferred embodiments of .cpp programs and .h library files of a preferred embodiment.

Referring then to FIG. 5, the communication board will be described. Communication board 210 includes a power management unit 502 connected to a radio frequency controller 504. The radio frequency controller is connected to bus 506. The radio frequency controller is also connected to GSM module 508 for global system and mobile communications. Radio frequency controller 504 is also connected to a Bluetooth module 510. Power management unit 502 is directly connected to and powers analog baseband module 512 and digital baseband module 514. Both analog baseband module 512 and digital baseband module 514 are connected to bus 506.

The power management module is also connected to power supply 516. The power management module is also connected to real time communications unit 518 which enables exchange of multimedia and audio content in real time. GPS receiver 520 is also connected to bus 506. Analog interface 522 includes audio interface 524 and Analog to Digital ("SIM") converter 526.

Digital interface 528 includes an interface for a subscriber identity module 530, a universal asynchronous receiver/transmitter 532, a keypad 534, an ion window manager 536, inter-integrated circuit (I2C computer bus) 538, a pulse code modulation decoder for representing sampled analog signals 540, and a universal serial bus 542.

In a preferred embodiment, the communication board is the Adafruit 808 GSM+GPS Shield based on the SIM800/SIM900 module. The 808 GSM+GPS Shield board is available from Adafruit Industries.

Referring then to FIG. 6A the functions 600 of a preferred embodiment will be described. At step 602, the system is initialized by activating the program code which is resident in flash memory. The code sets variables and initializes the processors as will be further described. Custom programming of the system can be accomplished at this step by changing certain variables which will change system operation. One example is changing the battery voltage level definitions as shown in relation to FIG. 8B, as will be further described. Another example is changing the system modes as shown in FIGS. 8N-8O, as will be further described. If changes are made, the code is downloaded to the processor at this step. In this embodiment, the code is written in C. Of course, other languages will suffice.

At step 603, the microprocessor continuously monitors IO6 for an over voltage condition. If at any time, an over voltage condition is detected, then an over voltage detection interrupt is indicated and the system performs steps 604-610 and disconnects the appropriate battery path (battery 1 or 2) with the overvoltage condition. Under normal operation conditions, the system executes step 604.

At step 604, the microprocessor reads the battery levels indicated by AD0 and AD1. A reference table similar to Table 1, is consulted which indexes battery voltages for battery 110 and battery 112 against a battery charge level or status. Table 1 shows a preferred embodiment of values for the voltage thresholds to determine battery charge and status.

TABLE 1

| Battery Charge/Status | Voltage Range (V) | |
| --- | --- | --- |
| | Low | High |
| VHIGH | 16.00 | 20.00 |
| VCHARGING | 12.75 | 15.99 |
| V100 | 12.50 | 12.74 |
| V75 | 12.16 | 12.49 |
| V50 | 11.86 | 12.15 |
| V25 | 11.62 | 11.85 |
| V0 | 11.5 | 11.61 |
| VFAIL | 2.00 | 11.49 |
| VGND | 0.00 | 1.99 |

The thresholds can be changed by the operator and programmed into the system based on the application.

Table 2 shows another preferred embodiment of values for voltage thresholds to determine battery charge and status.

TABLE 2

| Battery Charge/Status | Voltage Range (V) | |
| --- | --- | --- |
| | Low | High |
| VHIGH | 16.00 | 20.00 |
| VCHARGING | 12.75 | 15.99 |
| V100 | 12.50 | 12.74 |
| V75 | 12.25 | 12.49 |
| V50 | 12.00 | 12.24 |
| V25 | 11.75 | 11.99 |
| V0 | 11.5 | 11.74 |
| VFAIL | 2.00 | 11.49 |
| VGND | 0.00 | 1.99 |

At step 606, the system updates the system mode by indexing the battery voltage status for all batteries in the system, against another reference table (similar to FIG. 7A or FIG. 7B) to determine a system "mode", as will be further described. The system then moves to step 608.

At step 608, the microprocessor sends appropriate signals to IO4 and IO5, thereby setting relays 206 and 208 to connect either battery 110, battery 112, or both to the load. At step 609, the system loads the mode of the system into the communications board and instructs it to send the mode to the operator in a SMS format, if system mode has changed or the periodic communication time has been reached. Of course, other formats are possible in other embodiments. The system then moves to step 610. At step 610, the microprocessor delays all activity for a predetermined period of time. After the predetermined period of time, the system returns to step 604. The system loops through the flowchart in FIG. 6A periodically and continuously unless stimulated by an overvoltage or communication interrupt.

Referring to FIG. 6B a status request interrupt, 650 is described. At step 651, the microprocessor waits for an interrupt. At step 652, the microprocessor receives an interrupt request to display status, triggered by spring-loaded push-button switch U3 pressed by the operator. The system then moves to step 654. At step 654, the system generates a status code as shown in Table 3. At step 656, the microprocessor returns from the routine.

TABLE 3

BATTERY LEVELS

| ← BAT 1 | BAT 2 → |
| --- | --- |
| 1 FLASH | 2 FLASHES |
| UNKNOWN | BLANK |
| REG FAIL | RED |
| CHARGING | WHITE |
| HIGH | GREEN |
| MEDIUM | YELLOW |
| LOW | RED |
| BAT FAIL | CYAN |
| NO BAT | BLUE |

In a preferred embodiment, the system indicates the status of battery 110 by a single white flash followed by a single color LED flash indicating charge level or status and battery 112 by two white flashes followed by a single color LED flash indicating charge level or status. For each battery, if the charge level is low, a red signal is sent. If the battery is charging, a white signal is sent. If the battery charge level is high, a green signal is sent. If the battery charge condition is medium, a yellow signal is sent. If the battery charge regulator has failed indicating abnormally high voltage, a red signal is sent. If a battery has failed, a cyan signal is sent, and if no battery is present, a blue signal is sent.

Referring then to FIG. 6C a flowchart 675 for a preferred embodiment of system communications will be described. The smart switch can be equipped with a cellular communication module daughterboard for remote communication and control capability. Communication with the remote operator can be via SMS/text messages that include system status messages and alerts. The cellular communication module will be used either in continuous mode or hibernation mode to communicate with the remote operator. In the continuous mode it will allow incoming communication and connectivity to the switch, allowing the remote operator to monitor status and control the switch via a remote request or user interface. In the hibernation mode, the cellular communication module will be powered up either (a) periodically (period set by user) or (b) upon critical system mode change (such as low battery or battery failure), to send system status messages and alerts to the remote operator. The hibernation mode will be normally used due to power consumption considerations. In continuous communications mode, the system monitors for an interrupt signal from the communication board. If an interrupt is detected then a function is performed to initiate SMS communication with the operator as will be further described.

At step 677, the system waits for a system communication interrupt if it is in continuous communications mode only. Under the default hibernation mode the system goes periodically to step 679 directly, and checks whether the conditions to send a message to the operator have been met. The conditions that need to be met are either (a) system mode has changed or (b) periodic time for communication has been reached or (c) remote request text has been buffered while the system was offline. At step 681, if either step 677 or step 679 indicate that a message needs to be communicated to the remote operator, the system creates the status message to be sent via SMS text. At step 683, the system retrieves the phone number of the operator to which the text message is to be sent.

At step 685, the system activates the communications board which has been asleep, if the system communication board has been in hibernation mode. At step 687, the system loads the system status into a SMS packet. At step 689, the communications board sends the text message including the packet showing the system status details including battery voltages.

At step 691, the system returns from the handle communications routine.

Referring then to FIG. 7A, the system mode table will be described. The system mode table comprises six codes which are generated depending on a matrix of battery voltages. Table 4, below describes the system mode definitions.

TABLE 4

System Mode Definitions

E0 - only battery 1 supplying power
E1 - only battery 2 supplying power
E2 - no power - no battery voltages
M1 - normal mode switching periodically
M2 - switching based on battery levels
M3 - both batteries supplying power Table 3 shows that in mode E0 battery 110 alone is supplying power to the system. In mode E1 battery 112 alone is supplying power to the system. In mode E2 both batteries are not in service and no power is supplied to the system. In mode M1, considered "normal mode" the system toggles between battery 110 supplying power and battery 112 supplying power after the sleep cycle. In mode M2 the system switches between battery 110 and battery 112 so that the battery with the highest voltage level is connected to the system. In mode M3 both battery 110 and battery 112 are connected to the system and supply power to it.

As indicated earlier, voltage threshold settings (boundary voltage levels to determine battery charge or status) can vary based on operator or customer input for specific applications. Battery status is set to one of the charge or status modes indicated in Table 1. A system mode is set based on the mapping of the battery modes into a system mode table. For each set of battery modes a system mode can be and is assigned. Two embodiments of such assignment tables are shown in FIG. 7A and FIG. 7B, respectively. It can be seen from FIG. 7A that the system mode is set to E0 when battery 110 charge/status is V0, V25, V50, V75, V100 or VCHARGING AND battery 112 charge/status is VGND, VFAIL or VHIGH. Mode E1 is set where battery 110 charge/status is VGND, VFAIL or VHIGH and battery 112 charge/status is V0, V25, V50, V75, V100 or VCHARGING. Mode E2 is set when battery 110 charge/status is VGND, VFAIL or VHIGH AND battery 112 charge/status is also VGND, VFAIL or VHIGH.

Referring further to FIG. 7A, system mode is set to M1 when battery 110 charge/status is V0, V25, V50, V75, V100 or VCHARGING and battery 112 charge/status is V75, V100 or VCHARGING. System mode is also set to M1 when battery 110 charge/status is V75, V100 or VCHARGING and battery 112 charge/status is V0, V25, V50, V75, V100 or VCHARGING. The system mode M2 is set where battery 110 charge/status is V0, V25, or V50 AND battery 112 charge/status is V0, V25, or V50.

Referring to FIG. 7B, the system mode is set to E0 when battery 110 charge/status is V0, V25, V50, V75, V100 or VCHARGING and battery 112 charge/status is VGND, VFAIL or VHIGH. Mode E1 is set where battery 110 charge/status is VGND, VFAIL or VHIGH AND battery 112 charge/status is V0, V25, V50, V75, V100 or VCHARGING. Mode E2 is set when battery 110 charge/status is VGND, VFAIL or VHIGH AND battery 112 charge/status is also VGND, VFAIL or VHIGH.

Referring further to FIG. 7B, system mode is set to M1 when battery 110 charge/status is V0, V25, V50, V75, V100 or VCHARGING and battery 112 charge/status is V75, V100 or VCHARGING. System mode is also set to M1 when battery 110 charge/status is V75, V100 or VCHARGING and battery 112 charge/status is V0, V25, V50, V75, V100 or VCHARGING. The system mode M2 is set where battery 110 charge/status is V50 AND battery 112 charge/status is V0, V25, or V50. The system mode M2 is also set where battery 110 charge/status is V0, V25, or V50 AND battery 112 charge/status is V50. System mode M3 is set when battery 110 charge/status is V0 or V25 AND battery 112 charge/status is V0 or V25.

All voltages are sensed within a tolerance of about 0.2 volts without a precision voltage reference input and should be anticipated to be about the voltage specified. A precision voltage reference with 0.01% accuracy can be alternatively used to enhance accuracy.

Referring then to FIGS. 8A-8V, a preferred example of programming code, written in C, for controlling the microcontroller and the system is described.

Code section 802 loads libraries that contain functions to be executed by the processor. The processor libraries are available at https://github.com/leomil72/analogComp and https://github.com/n0m1/Sleep_n0m1. Code section 802 also loads libraries that contain functions to be executed by the communications board. The Adafruit libraries are available at https://github.com/adafruit/Adafruit_FONA.

Code section 804 defines variables and parameter definitions to be used by the program.

Code section 806 defines the setup function which runs during system initialization. This section invokes several libraries of the microcontroller to test system functions. The libraries are located at https://www.arduino.cc/en/Reference/Libraries.

During code section 806, the data rate is set for the communications board and the SIM card IEMI number is located and retrieved. During code section 806, the sleep time variable is set and the relays are tested. Initial battery levels are set. Scaling factors for the analog input are set. Voltage divider ratios are set. Initial relay variables are set. Initial mode of the system is set. The system then enables interrupts, tests the battery levels, and updates the battery mode and system mode. The system then defines the colors of the LED to be displayed during various system status interrupt responses.

The fona.getIMEI function retrieves the SIM card number from the communication board. The serial.begin function sets the data rate in bits per second per a serial data transmission. The interrupt for the digital pin is attached to a specific interrupt service routine. The pinmode function configures the specified pins of the microprocessor to behave either as an input or an output. Interrupts are enabled after system setup is complete. The delay function suspends the program for 100 clock cycles. The digital color LED is cycled through the specified status colors for a specified number of clock cycles indicating the conclusion of the startup sequence. The analogcomparator function is enabled with AIN0 and AIN1 as inputs. The analogcomparator.enable interrupt function is attached and to enable execution when a difference occurs between the voltages at pins AIN0 and AIN1.

In code section 808, the system enters a repetitive loop to monitor communications, measure the battery levels, update the system mode, and set the relays on a continuous basis. The program then enters power savings mode while monitoring for any interrupts that may occur.

The digitalread function reads the value from a specified microprocessor pin, either low or high to determine if the system is in DEBUG mode. The handle communications function is also called to send any text messages if necessary conditions have been met. The sleep.ADCmode function sets the microprocessor into an idle sleep mode thereby saving power. The function stops the MCU but leaves the peripherals and timer running. The sleep.sleepDelay function sets the number of clock cycles during which the power setting mode is active.

At code section 810, a function is provided to measure the battery 110 and battery 112 voltage levels. In this section, the microprocessor reads A0 and A1, averaged over four readings to reduce noise and applies a scale factor before exiting.

The analogread function obtains the analog voltage value at the specified pin.

At code section 812, a function is provided which compares the battery levels to determine battery charge/status.

At code section 814, the system mode is updated to implement the tables showed in either FIG. 7A or FIG. 7B.

At code section 816, the program sets the relays according to the system mode provided in the tables. The digitalwrite function sets the value at a specified microprocessor pin to either high or low. In mode M1 the system toggles the battery supplying power to the pump controller after the sleep delay. If there are two batteries and one battery is currently supplying power, the system will switch to the other battery allowing the first battery to be charged for the ensuing delay period. The process is repeated as long as the system is in mode M1.

At code section 818, the LED is set to indicate the battery status for batteries 110 and 112 according to Table 1 and Table 2.

At code section 820, the processor is instructed to set the red, green, and blue LED pins to implement the mode defined in code section 818.

At code section 822, a function is provided which sets the flag indicating that the operator has requested status indicator display using the interrupt mechanism.

At code section 824, a function is provided which services the analog interrupt which occurs when one of the two batteries is in over voltage condition.

At code section 826, the handlecommunications function is defined. The handlecommunications function loads a value for the battery levels of battery 110 and battery 112 into the reply buffer variable. The function also defines two cases, COMMCONTINUOUS and COMMHIBERNATE. During a COMMCONTINOUS case the function checks to see if a SMS message has been received, and if so, it responds. The function also monitors the modes of the system, and if a system error occurs, sends a SMS message to the operator. In the default case COMMHIBERNATE, the function powers up the communications board only if a problem arises. Once powered up, the board is instructed to send a SMS message located in the reply buffer variable. The function then powers down the communications board to save power.

The fona.powerstatus function returns true if the communications board is powered up and functioning. The fona.powerup function turns on the communication board. The fona.available returns true if data is present in the communications board incoming memory. The fona.read function returns the data in the communication board memory. The fona.getSMSSender function which returns a designated number of characters from the communications board which define the SMS sender address and phone number. The fona.sendSMS sends the content of a variable to a designated phone number in SMS format. The fona.deleteSMS function clears SMS messages from incoming slots. The fona.powerdownfunction turns off the communications board.

Referring then to FIGS. 9A-9G, the program listing of the analog cop analogComp.cpp file is shown. The functions are described in the remarks in the Figure.

Referring then to FIGS. 9H-9J, the program list of the analogComp_h and shows a library file referenced by the analog cob function. The functions are described in the remarks in the Figure.

Referring then to FIGS. 9K-9Q, the Sleep_n0m1.cpp file is shown. The functions are described in the remarks in the Figure.

Referring then to FIGS. 9R-9U, the Sleep_n0m1.h libraries are defined. The functions are described in the remarks in the Figure.

It will be appreciated by those skilled in the art that the described embodiments disclose significantly more than an abstract idea including technical advancements in the field of data processing and a transformation of data which is directly related to real world objects and situations in that the disclosed embodiments enable a computer to operate more efficiently. For example, the disclosed embodiments transform positions, orientations, and movements of durable plant tags as well as transforming one or more servers and hand held devices from one state to another state.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. A system for balancing a supply power to a load from a first battery through a first switch, and from a second battery through a second switch, comprising:
   a microcontroller;
   a memory connected to the microcontroller;
   a first sensor connected to the microcontroller and the first battery;
   the first battery connected to the first switch;
   a second sensor connected to the microcontroller and the second battery;
   the second battery connected to the second switch;
   the microcontroller configured to:
      measure a first voltage level of the first battery with the first sensor;
      measure a second voltage level of the second battery with the second sensor;
      compare the first voltage level and the second voltage level to a voltage table to determine a set of system modes;
      set the first switch to a first position according to the system mode;
      set the second switch to a second position according to the system mode;
      whereby one of the group of the first battery, the second battery and a combination of the first battery and the second battery is connected to the load by one or more of the first position and the second position; and,
      enter a sleep state to conserve the supply power, for a predetermined period of time, in which no comparison of the first voltage level and the second voltage level is made and in which the first position and the second position are not changed.

2. The system of claim 1 wherein the microcontroller is further configured to:
   cancel the sleep state if an overvolt condition is detected at one or more of the first battery and the second battery.

3. The system of claim 1 wherein the set of system modes further comprises:
   a first system mode whereby the first switch and the second switch are set to alternately supply power from the first battery and the second battery to the load; and,
   a second system mode whereby the first switch and the second switch are set to supply power to the load based on the first voltage level and the second voltage level.

4. The system of claim 3 wherein the set of system modes further comprises a third system mode whereby the first switch and the second switch are set to supply power from both the first battery and the second battery to the load.

5. The system of claim 4 wherein the microprocessor is further configured to:
   set visual indicator according to a system mode of the set of system modes.

6. The system of claim 4 further comprising a communications circuit connected to the microprocessor and the microprocessor is further configured to send a message from the communications circuit based on a system mode of the set of system modes.

7. The system of claim 1 wherein the voltage table further comprises:
a first set of voltage ranges related to the first battery;
a second set of voltage ranges related to the second battery; and,
the set of system modes corresponding to at least one voltage range from the first set of voltage ranges and at least one voltage range from the second set of voltage ranges.

8. The system of claim 7 wherein the first set of voltage ranges further comprises a first set of thresholds and the second set of voltage ranges further comprises a second set of thresholds.

9. The system of claim 7 wherein the first set of voltage ranges further comprises:
about 0.0 to about 1.99 volts;
about 2.0 to about 11.49 volts;
about 11.5 to about 11.61 volts;
about 11.62 to about 11.85 volts;
about 11.86 to about 12.15 volts;
about 12.16 to about 12.49 volts;
about 12.50 to about 12.74 volts;
about 12.75 to about 15.99 volts; and,
greater than about 16 volts;
And the second set of voltage ranges further comprises:
about 0.0 to about 1.99 volts;
about 2.0 to about 11.49 volts;
about 11.5 to about 11.61 volts;
about 11.62 to about 11.85 volts;
about 11.86 to about 12.15 volts;
about 12.16 to about 12.49 volts;
about 12.50 to about 12.74 volts;
about 12.75 to about 15.99 volts; and,
greater than about 16 volts.

10. A system for balancing a supply power to a load from a first battery through a first switch, and from a second battery through a second switch, comprising:
a microcontroller;
a memory connected to the microcontroller;
a first sensor connected to the microcontroller and the first battery;
the first battery connected to the first switch;
a second sensor connected to the microcontroller and the second battery;
the second battery connected to the second switch;
the microcontroller configured to:
measure a first voltage level of the first battery with the first sensor;
measure a second voltage level of the second battery with the second sensor;
compare the first voltage level and the second voltage level to a voltage table to determine a set of system modes;
set the first switch according to the system mode;
set the second switch according to the system mode;
whereby one of the group of the first battery, the second battery and a combination of the first battery and the second battery is connected to the load;
enter a sleep state to conserve the supply power, for a predetermined period of time, where no comparison of the first voltage level and the second voltage level are made;
wherein the set of system modes further comprises:
a first system mode whereby the first switch and the second switch are set to alternately supply power from the first battery and the second battery to the load;
a second system mode whereby the first switch and the second switch are set to supply power to the load based on the first voltage level and the second voltage level;
a third system mode whereby the first switch and the second switch are set to supply power from both the first battery and the second battery to the load;
wherein the set of system modes further comprises:
the first system mode wherein one condition is met of the group of:
the first voltage level is between about 11.5 and about 16 volts and the second voltage level is between about 12.16 and about 16 volts; and,
the first voltage level is between about 12.16 and about 16 volts and the second voltage level is between about 11.5 and about 12.16 volts;
the second system mode wherein the first voltage level is between about 11.5 and about 12.16 volts and the second voltage level is between about 11.5 and about 12.16 volts.

11. The system of claim 10 wherein the processor is further configured to:
set the first switch and the second switch to alternate a supply of power to the load from the first battery and the second battery in the first system mode; and,
set the first switch and the second switch to supply power to the load from either the first battery or the second battery dependent on the first voltage level and the second voltage level in the second system mode.

12. A system for balancing a supply power to a load from a first battery through a first switch, and from a second battery through a second switch, comprising:
a microcontroller;
a memory connected to the microcontroller;
a first sensor connected to the microcontroller and the first battery;
the first battery connected to the first switch;
a second sensor connected to the microcontroller and the second battery;
the second battery connected to the second switch;
the microcontroller configured to:
measure a first voltage level of the first battery with the first sensor;
measure a second voltage level of the second battery with the second sensor;
compare the first voltage level and the second voltage level to a voltage table to determine a set of system modes;
set the first switch according to the system mode;
set the second switch according to the system mode;
whereby one of the group of the first battery, the second battery and a combination of the first battery and the second battery is connected to the load;
enter a sleep state to conserve the supply power, for a predetermined period of time, where no comparison of the first voltage level and the second voltage level are made;
wherein the voltage table further comprises:
a first set of voltage ranges related to the first battery;
a second set of voltage ranges related to the second battery;
a set of system modes corresponding to at least one voltage range from the first set of voltage ranges and at least one voltage range from the second set of voltage ranges;

wherein the set of system modes further comprises:
a first system mode wherein one condition is met of the group of:
the first voltage level is between about 11.5 and about 12.16 volts and the second voltage level is between about 11.86 and about 12.16 volts; and,
the first voltage level is between about 11.86 and about 12.16 volts and the second voltage level is between about 11.5 and about 11.86 volts;
a second system mode wherein one condition is met of the group of:
the first voltage level is between about 11.5 and about 12.16 volts and the second voltage level is between about 11.86 and about 12.16 volts; and,
the first voltage level is between about 11.86 and about 12.16 volts and the second voltage level is between about 11.5 and about 11.86 volts; and,
a third system mode wherein the first voltage level is between about 11.5 and about 11.86 volts and the second voltage level is between about 11.5 and about 11.86 volts.

13. The system of claim 12 wherein the processor is further configured to:
set the first switch and the second switch to alternate a supply power to the load from the first battery and the second battery in the first system mode; and,
set the first switch and the second switch to supply power to the load from either the first battery or the second battery dependent on the first voltage level and the second voltage level in the second system mode;
set the first switch and the second switch to supply power to the load from both the first battery and the second battery in the third system mode.

14. The system of claim 12 further comprising:
a fourth system mode wherein:
the first voltage level is between about 11.5 and about 16 volts and the second voltage level is between about 0 and about 11.5 volts or above about 16 volts;
a fifth system mode wherein:
the first voltage level is between about 0 and about 11.5 volts or above about 16 volts and the second voltage level is between about 11.5 and about 16 volts; and,
a sixth system mode wherein:
the first voltage level is between about 0 and about 11.5 volts or above about 16 volts and the second voltage level is between about 0 and about 11.5 volts or above about 16 volts.

15. The system of claim 14 wherein the processor is further configured to:
set the first switch and the second switch to supply power from the first battery in the fourth system mode; and,
set the first switch and the second switch to supply power from the second battery in the fifth system mode.

16. A method for balancing a supply power to a load from a first battery and from a second battery comprising:
periodically measuring a first voltage level from the first battery;
periodically measuring a second voltage level from the second battery;
determining a system mode by comparing the first voltage level and the second voltage to a voltage look-up table;
setting a first switch connected between the first battery and the load to a first position, according to the system mode;
setting a second switch connected between the second battery and the load to a second position, according to the system mode;
entering a sleep mode to conserve the supply power, for a predetermined period time, in which no comparison of the first voltage level and the second voltage level is made and in which the first position and the second position are not changed; and,
generating an interrupt that cancels sleep mode upon an overvolt condition at one or more of the first battery and the second battery.

17. The method of claim 16 further comprising the steps of:
setting the first switch and the second switch in an alternating pattern when in a first system mode; and,
setting the first switch and the second switch according to the first voltage level and the second voltage level in a second system mode.

18. The method of claim 16 further comprising the step of:
activating an indicator according to the system mode.

19. The method of claim 16 further comprising the step of:
sending a wireless signal according to the system mode.

20. A method for balancing a supply power to a load from a first battery and from a second battery comprising:
periodically measuring a first voltage level from the first battery;
periodically measuring a second voltage level from the second battery;
determining a system mode by comparing the first voltage level and the second voltage to a voltage look-up table;
setting a first switch connected between the first battery and the load according to the system mode;
setting a second switch connected between the second battery and the load according to the system mode;
entering a sleep mode to conserve the supply power, for a predetermined period time, where no comparison of the first voltage level and the second voltage level is made; and,
generating an interrupt that cancels the sleep mode upon an overvolt condition at one or more of the first battery and the second battery;
wherein the step of determining further comprises:
determining one of the group of:
a first system mode wherein one condition is met of the group of:
the first voltage range is one of the group of V0, V25, V50, V75, V100 and VCHARGING and the second voltage range is one of the group of V75, V100 and VCHARGING; and,
the first voltage range is V75, V100 or VCHARGING and the second voltage range is one of the group of V0, V25, and V50;
a second system mode wherein the first voltage range is V0, V25, or V50 and the second voltage range is one of the group of V0, V25, and V50;
where:
VO is between about 0.0 and about 2.0 volts;
V25 is between about 11.5 and about 11.62 volts;
V50 is between about 11.86 and about 12.16 volts;
V75 is between about 12.16 and 12.49 volts;
V100 is between about 12.49 and 12.75 volts; and
VCHARGING is between about 17.75 and about 16.0 volts.

21. A method for balancing a supply power to a load from a first battery and from a second battery comprising:
periodically measuring a first voltage level from the first battery;
periodically measuring a second voltage level from the second battery;

determining a system mode by comparing the first voltage level and the second voltage to a voltage look-up table;
setting a first switch connected between the first battery and the load according to the system mode;
setting a second switch connected between the second battery and the load according to the system mode;
entering a sleep mode to conserve the supply power, for a predetermined period time, where no comparison of the first voltage level and the second voltage level is made; and,
generating an interrupt that cancels the sleep mode upon an overvolt condition at one or more of the first battery and the second battery;
wherein the step of determining further comprises:
determining one of the group of:
   a first system mode wherein one condition is met of the group of:
      the first voltage range is one of the group of V0, V25, V50, V75, V100 and VCHARGING and the second voltage range is one of the group of V75, V100 and VCHARGING; and,
      the first voltage range is one of the group of V75, V100 or VCHARGING and the second voltage range is V0, V25, and V50;
   a second system mode wherein one condition is met of the group of:
      the first voltage range is one of the group of V0, V25, V50, V75, V100 and VCHARGING and the second voltage range V75, V100 or VCHARGING;
      the first voltage range is one of the group of V75, V100 and VCHARGING and the second voltage range is V0, V25, or V50; and,
   a third system mode wherein the first voltage range is one of the group of V0 and V25 and the second voltage range is V0 and V25;
where:
VO is between about 0.0 and about 2.0 volts;
V25 is between about 11.5 and about 11.62 volts;
V50 is between about 11.86 and about 12.16 volts;
V75 is between about 12.16 and 12.49 volts;
V100 is between about 12.49 and 12.75 volts; and
VCHARGING is between about 17.75 and about 16.0 volts.

22. The method of claim 21 further comprising the steps of:
setting the first switch and the second switch in an alternating pattern in the first system mode;
setting the first switch and the second switch according to the first voltage level and the second voltage level in the second system mode; and,
setting the first switch and the second switch to both supply power to the load in the third system mode.

* * * * *